US012603452B2

(12) United States Patent
Hsu et al.

(10) Patent No.: US 12,603,452 B2
(45) Date of Patent: Apr. 14, 2026

(54) CABLE CONNECTOR WITH IMPROVED SIGNAL INTEGRITY AND CONNECTOR ASSEMBLY HAVING THE SAME

(71) Applicant: Luxshare Precision Industry Company Limited, Shenzhen (CN)

(72) Inventors: Chien-Yu Hsu, Shenzhen (CN); Ruey-Ting Liao, Shenzhen (CN); Shih-Tung Lin, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 548 days.

(21) Appl. No.: 18/100,866

(22) Filed: Jan. 24, 2023

(65) Prior Publication Data

US 2024/0006793 A1 Jan. 4, 2024

(30) Foreign Application Priority Data

Jul. 1, 2022 (CN) ......................... 202210768559.3

(51) Int. Cl.
*H01R 13/405* (2006.01)
*H01R 12/75* (2011.01)
(Continued)

(52) U.S. Cl.
CPC ........... *H01R 13/405* (2013.01); *H01R 12/75* (2013.01); *H01R 13/02* (2013.01); *H01R 13/40* (2013.01);
(Continued)

(58) Field of Classification Search
CPC ...... H01R 13/405; H01R 12/75; H01R 13/02; H01R 13/40; H01R 13/648;
(Continued)

(56) References Cited

U.S. PATENT DOCUMENTS 6,179,645 B1 1/2001 Huang
2021/0126404 A1* 4/2021 Laurx ................ H01R 13/6471
(Continued)

FOREIGN PATENT DOCUMENTS

CN 102570187 A 7/2012
CN 206388888 U 8/2017
(Continued)

*Primary Examiner* — Justin M Kratt
(74) *Attorney, Agent, or Firm* — Birch, Stewart, Kolasch & Birch, LLP

(57) ABSTRACT

A cable connector includes an insulating body, a number of cable conductive terminals, a number of cables and a grounding shell. The insulating body extends along a first direction and a second direction. The cable conductive terminals include a number of first cable conductive terminals disposed in a first row and a number of second cable conductive terminals disposed in a second row. Each of the first cable conductive terminals includes a first mating portion and a first mounting portion. Each of the second cable conductive terminals includes a second mating portion and a second mounting portion. The first mounting portions are flush with the second mounting portions. The grounding shell includes a spacer between the first cable conductive terminals and the second cable conductive terminals to improve signal integrity. A connector assembly having the cable connector is also disclosed.

11 Claims, 26 Drawing Sheets

(51) Int. Cl.

| | |
|---|---|
| ***H01R 13/02*** | (2006.01) |
| ***H01R 13/40*** | (2006.01) |
| ***H01R 13/648*** | (2006.01) |
| ***H01R 13/6585*** | (2011.01) |
| ***H01R 13/6593*** | (2011.01) |
| *H01R 4/02* | (2006.01) |
| *H01R 12/77* | (2011.01) |
| *H01R 13/24* | (2006.01) |
| *H01R 13/652* | (2006.01) |
| *H01R 13/658* | (2011.01) |
| *H01R 13/6581* | (2011.01) |
| *H01R 13/6592* | (2011.01) |
| *H01R 13/6594* | (2011.01) |
| *H01R 13/6595* | (2011.01) |

(52) U.S. Cl.

CPC ....... *H01R 13/648* (2013.01); *H01R 13/6585* (2013.01); *H01R 13/6593* (2013.01); *H01R 4/023* (2013.01); *H01R 12/775* (2013.01); *H01R 13/24* (2013.01); *H01R 13/652* (2013.01); *H01R 13/658* (2013.01); *H01R 13/6581* (2013.01); *H01R 13/6592* (2013.01); *H01R 13/6594* (2013.01); *H01R 13/6595* (2013.01)

(58) Field of Classification Search

CPC H01R 13/6585; H01R 13/6593; H01R 4/023; H01R 12/775; H01R 13/24; H01R 13/652; H01R 13/658; H01R 13/6581; H01R 13/6592; H01R 13/6594; H01R 13/6595

See application file for complete search history.

(56) References Cited

U.S. PATENT DOCUMENTS

| | | | | |
|---|---|---|---|---|
| 2021/0313721 | A1* | 10/2021 | Little ................. | H01R 13/6272 |
| 2022/0094112 | A1* | 3/2022 | Kim ................... | H01R 13/6471 |

FOREIGN PATENT DOCUMENTS

| | | | | |
|---|---|---|---|---|
| CN | 113302803 | A | | 8/2021 |
| CN | 113555708 | A | | 10/2021 |
| CN | 216055506 | U | | 3/2022 |
| CN | 114556705 | A | | 5/2022 |
| KR | 10-2085257 | B1 | | 3/2020 |
| TW | I456850 | B | | 10/2014 |
| TW | M539731 | U | * | 4/2017 |
| TW | M614553 | U | | 7/2021 |
| TW | I744740 | B | | 11/2021 |

* cited by examiner

CABLE CONNECTOR WITH IMPROVED SIGNAL INTEGRITY AND CONNECTOR ASSEMBLY HAVING THE SAME

CROSS-REFERENCE TO RELATED APPLICATION

This patent application claims priority of a Chinese Patent Application No. 202210768559.3, filed on Jul. 1, 2022 and titled "CABLE CONNECTOR AND CONNECTOR ASSEMBLY HAVING THE SAME", the entire content of which is incorporated herein by reference.

TECHNICAL FIELD

The present disclosure relates to a cable connector and a connector assembly, which belongs to a technical field of connectors.

BACKGROUND

A connector assembly in the related art generally includes a first connector and a second connector mated with each other. When the connector assembly is used to connect a cable and a circuit board, the connector assembly is generally referred to as a wire-to-board-end connector assembly. In this case, the first connector is a cable connector, and the second connector is a board-end connector.

With the continuous increase in terminal density and the trend of miniaturization of connectors, this brings challenges to the terminal layout of cable connectors. On the one hand, it is necessary to solve the problem of connecting terminals and cables, and on the other hand, it is necessary to improve the shielding performance and improve the signal integrity.

Therefore, it is desirable to develop an improved cable connector and a connector assembly.

SUMMARY

An object of the present disclosure is to provide a cable connector which is easy to arrange and has better signal integrity, and a connector assembly having the cable connector.

In order to achieve the above object, the present disclosure adopts the following technical solution: a cable connector, including: an insulating body extending along a first direction and a second direction, the first direction being perpendicular to the second direction; a plurality of cable conductive terminals including a plurality of first cable conductive terminals disposed in a first row along the second direction and a plurality of second cable conductive terminals disposed in a second row along the second direction, the plurality of first cable conductive terminals in the first row and the plurality of second cable conductive terminals in the second row being disposed at intervals along the first direction for two rows, the plurality of first cable conductive terminals in the first row and the plurality of second cable conductive terminals in the second row being misaligned in the first direction, each of the first cable conductive terminals including a first mating portion and a first mounting portion, each of the second cable conductive terminals including a second mating portion and a second mounting portion, the plurality of first mounting portions of the plurality of first cable conductive terminals being flush with the plurality of second mounting portions of the plurality of second cable conductive terminals; a plurality of cables including a plurality of first cables connected to the plurality of first mounting portions and a plurality of second cables connected to the plurality of second mounting portions; and a grounding shell including an isolator extending along the second direction, the isolator being located between the plurality of first cable conductive terminals of the first row and the plurality of second cable conductive terminals of the second row along the first direction.

In order to achieve the above object, the present disclosure adopts the following technical solution: a cable connector, including: an insulating body extending along a first direction and a second direction which is perpendicular to the first direction; a plurality of cable conductive terminals including a plurality of first cable conductive terminals disposed in a first row along the second direction and a plurality of second cable conductive terminals disposed in a second row along the second direction, the plurality of first cable conductive terminals of the first row and the plurality of second cable conductive terminals of the second row being parallel to each other, each of the first cable conductive terminals including a first mating portion and a first mounting portion, each of the second cable conductive terminals including a second mating portion and a second mounting portion, the plurality of first mounting portions of the plurality of first cable conductive terminals being flush with the plurality of second mounting portions of the plurality of second cable conductive terminals, the plurality of first cable conductive terminals including a plurality of first signal terminals and a plurality of second signal terminals, the first signal terminal and the second signal terminal located adjacent to the first signal terminal forming a first differential pair, the plurality of second cable conductive terminals including a plurality of third signal terminals and a plurality of fourth signal terminals, the third signal terminal and the fourth signal terminal located adjacent to the third signal terminal forming a second differential pair, the first differential pair and the second differential pair are misaligned in the first direction; a plurality of cables including a plurality of first cables connected to the plurality of first mounting portions and a plurality of second cables connected to the plurality of second mounting portions; and a grounding shell including at least one first ground terminal integrally extending from the grounding shell and at least one second ground terminal integrally extending from the grounding shell, the at least one first ground terminal being located in the first row and beside the first differential pair, the at least one second ground terminal being located in the second row and beside the second differential pair.

In order to achieve the above object, the present disclosure adopts the following technical solution: a connector assembly, including: the aforementioned cable connector; and a board-end connector configured to be mounted on a circuit board, the board-end connector including a mating insulating body and a plurality of mating conductive terminals fixed to the mating insulating body, the mating conductive terminals including a plurality of first mating conductive terminals disposed in one row and a plurality of second mating conductive terminals disposed in another row, each of the first mating conductive terminals including a first contact portion, each of the second mating conductive terminals including a second contact portion, the first contact portion is in contact with the first mating portion, and the second contact portion is in contact with the second mating portion.

Compared with the prior art, by arranging the plurality of first cable conductive terminals of the first row and the plurality of second cable conductive terminals of the second row misalignment in the first direction, and by flushing the plurality of first mounting portions of the plurality of first cable conductive terminals with the plurality of second mounting portions of the plurality of second cable conductive terminals, the present disclosure improves the arrangement of the first cable conductive terminals and the second cable conductive terminals. In addition, by arranging an isolator or a first ground terminal/second ground terminal between the first cable conductive terminals of the first row and the second cable conductive terminals of the second row, the cable conductive terminals can be well shielded, crosstalk is reduced, and signal integrity is improved.

DETAILED DESCRIPTION

Figure 1:
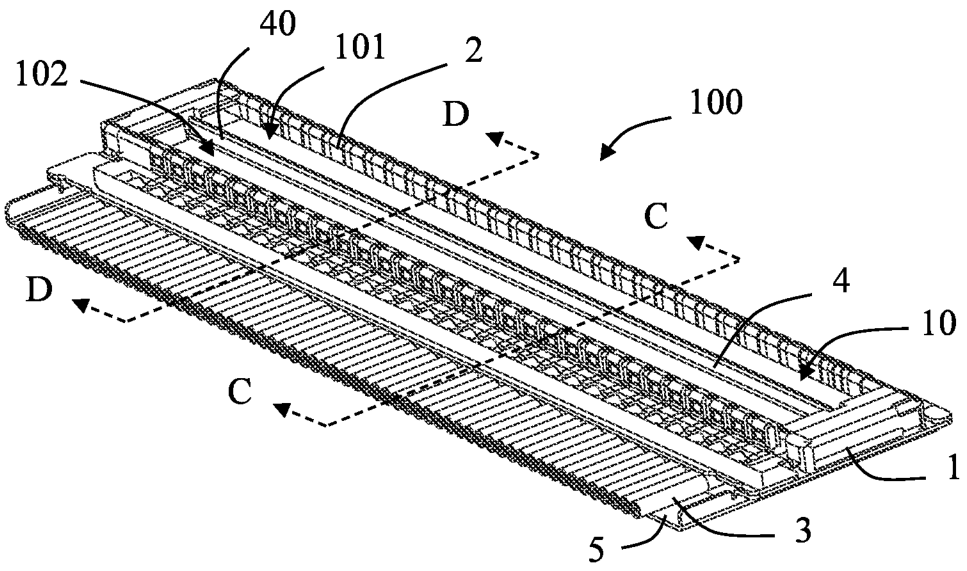
FIG. 1 is a schematic perspective view of a cable connector in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 17 to 20, the illustrated embodiments of the present disclosure discloses a connector assembly including a first connector (e.g., a cable connector 100) and a second connector (e.g., a board-end connector 200) for mating with the first connector.

Figure 21:
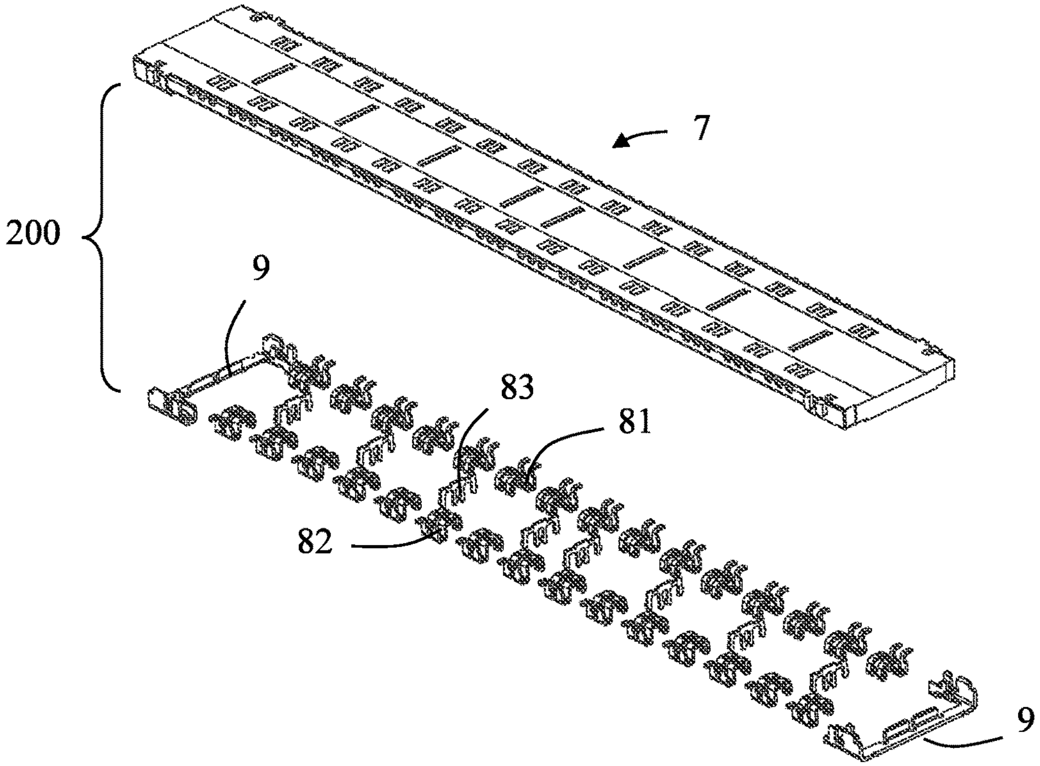
FIG. 21 is a partial perspective exploded view of the board-end connector in FIG. 19.
Figure 22:
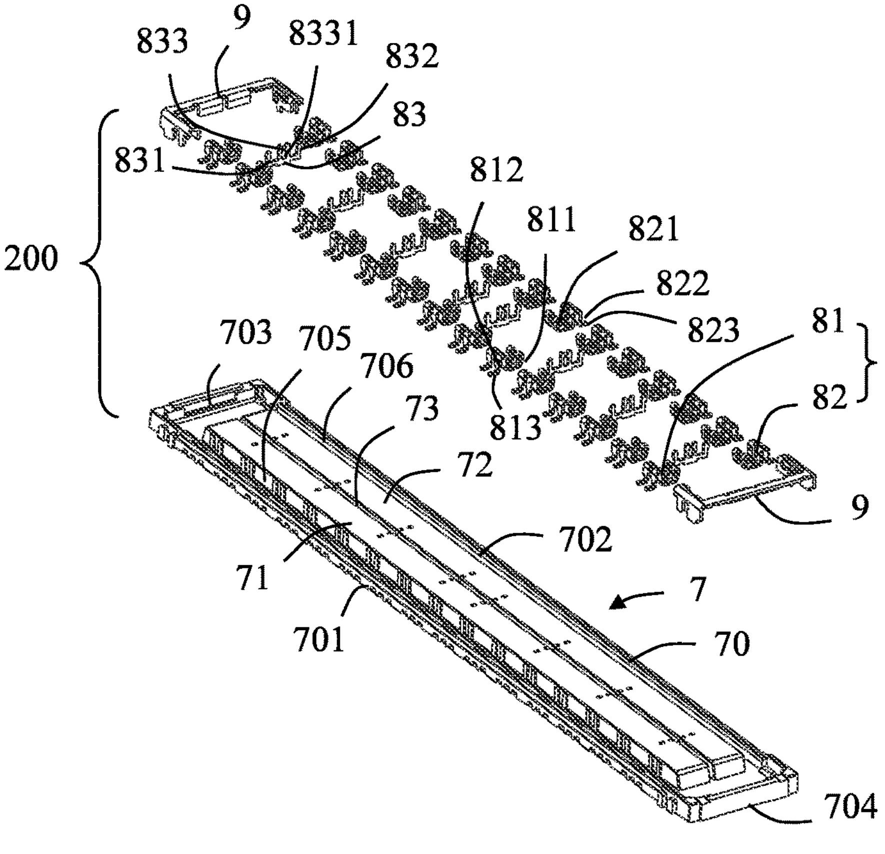
FIG. 22 is a partially exploded perspective view of FIG. 21 from another angle.
Figure 23:
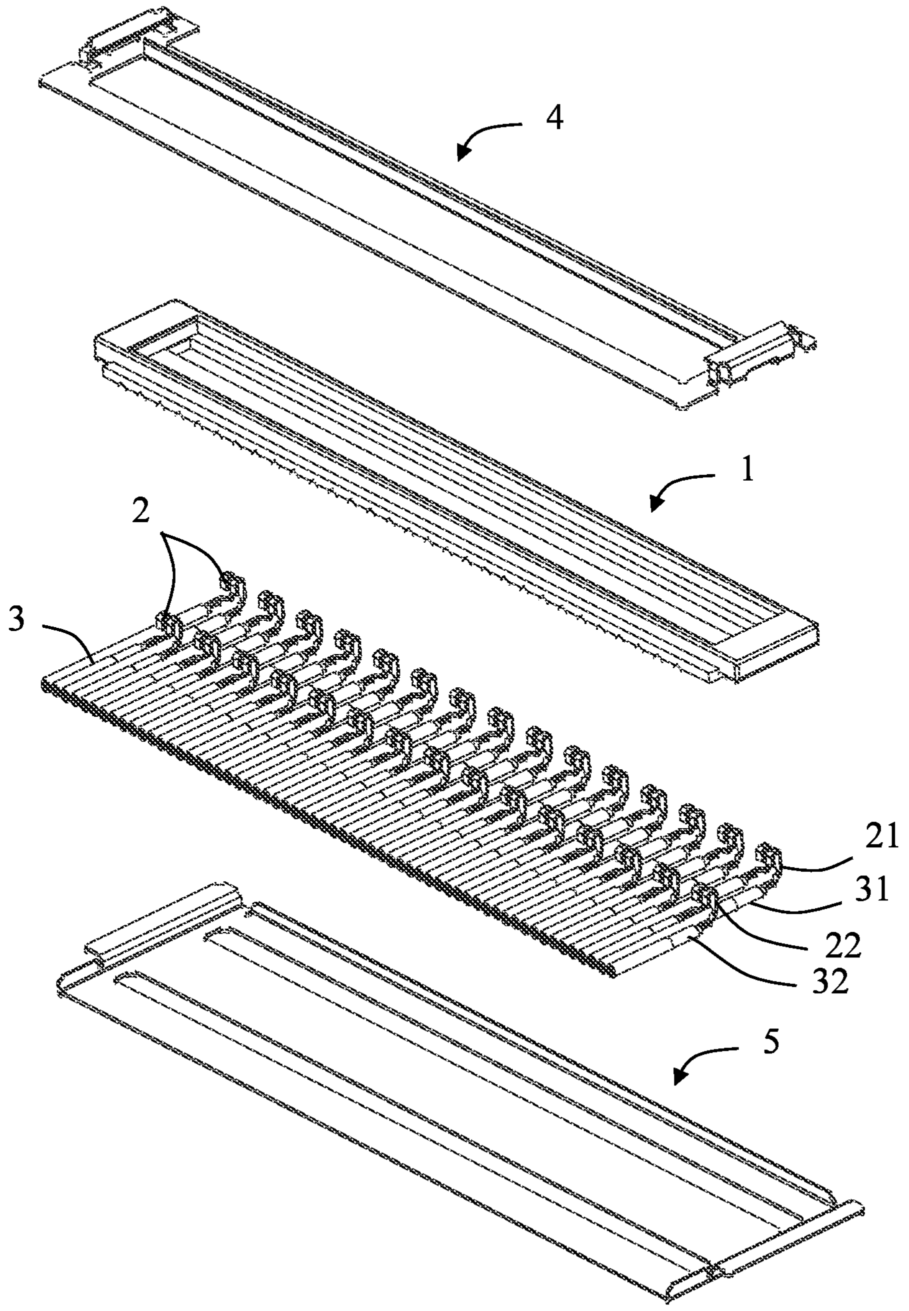
FIG. 23 is a partially exploded perspective view of the cable connector of FIG. 19.
Figure 24:
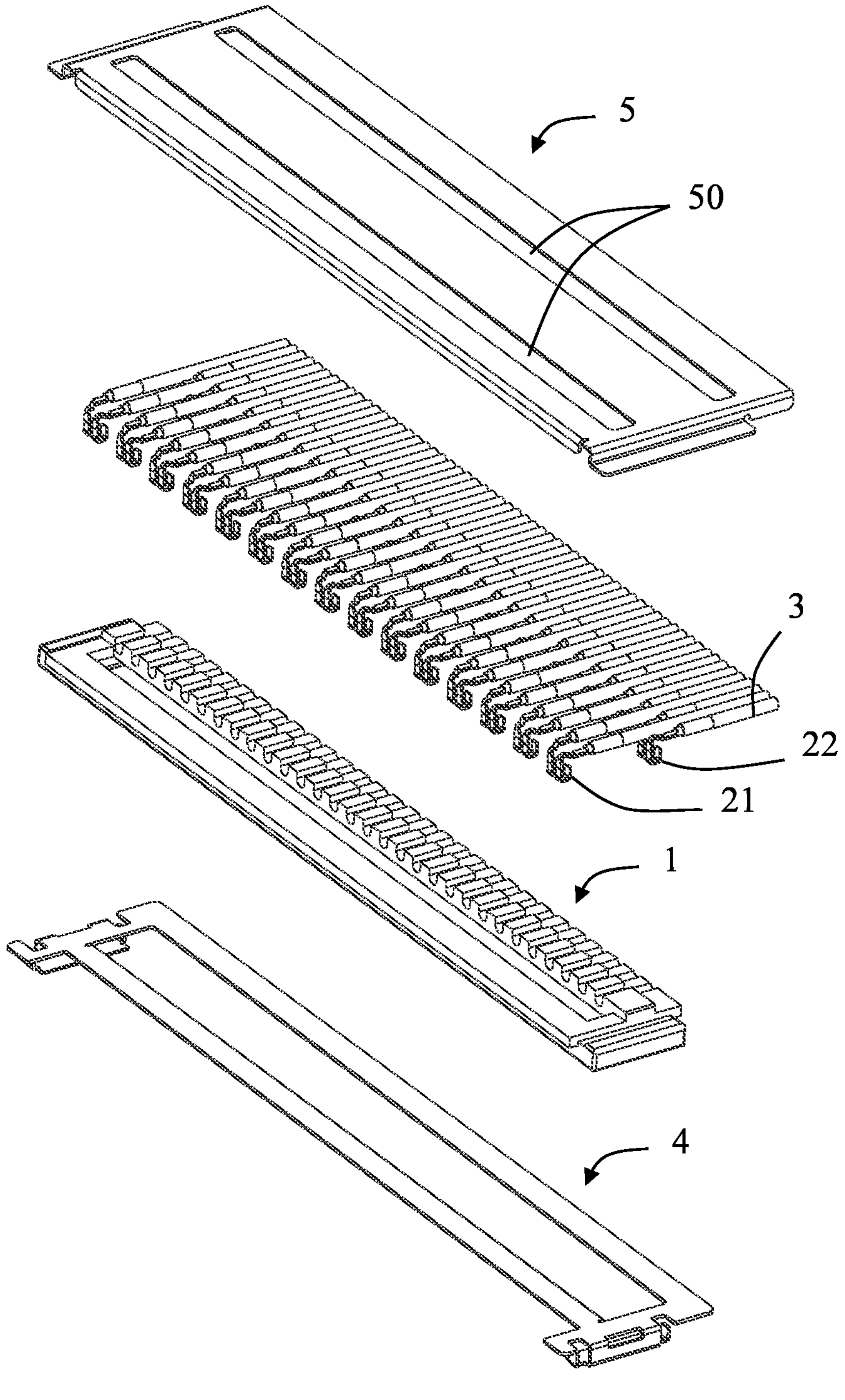
FIG. 24 is a partially exploded perspective view of FIG. 23 from another angle.
Figure 25:
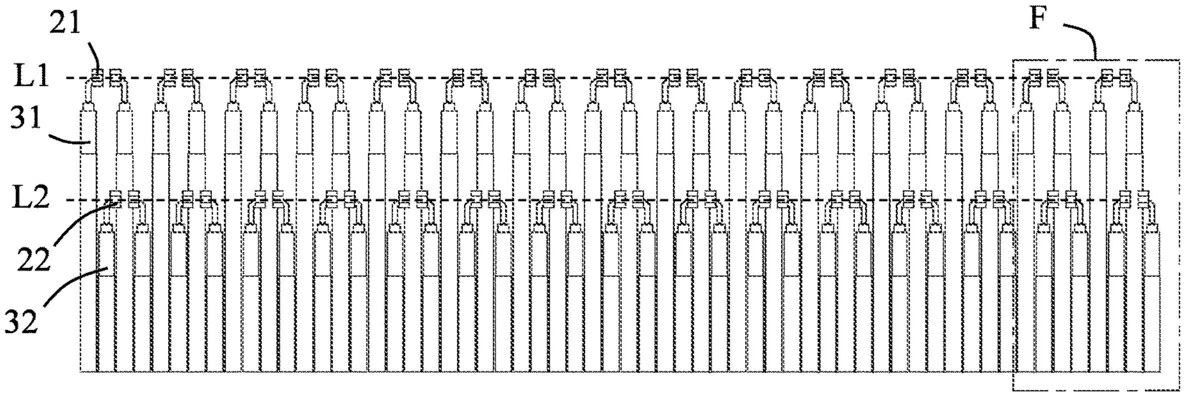
FIG. 25 is a top view of when the first cables and the second cables in FIG. 23 are fixed with the first cable conductive terminals and the second cable conductive terminals, respectively.
Figure 30:
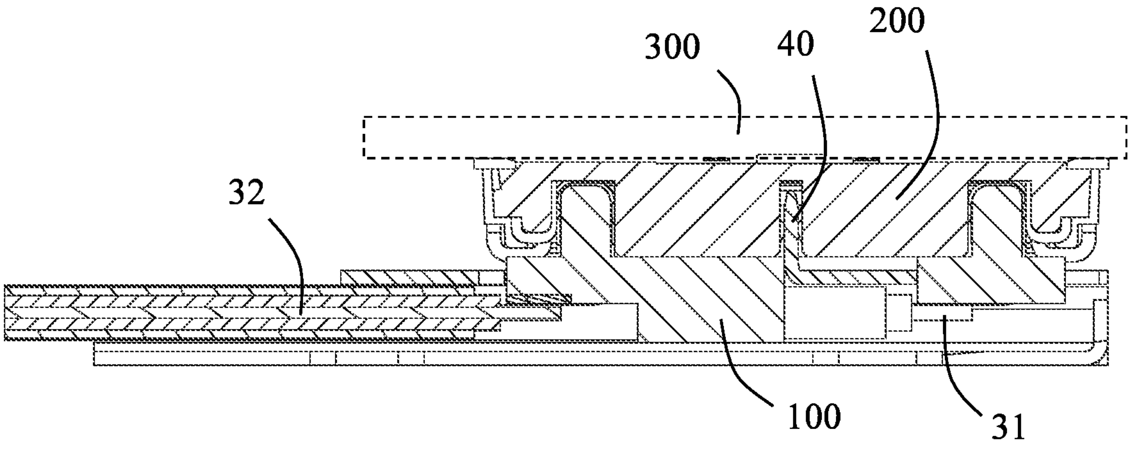
FIG. 30 is a schematic cross-sectional view taken along line H-H in FIG. 17.
Figure 31:
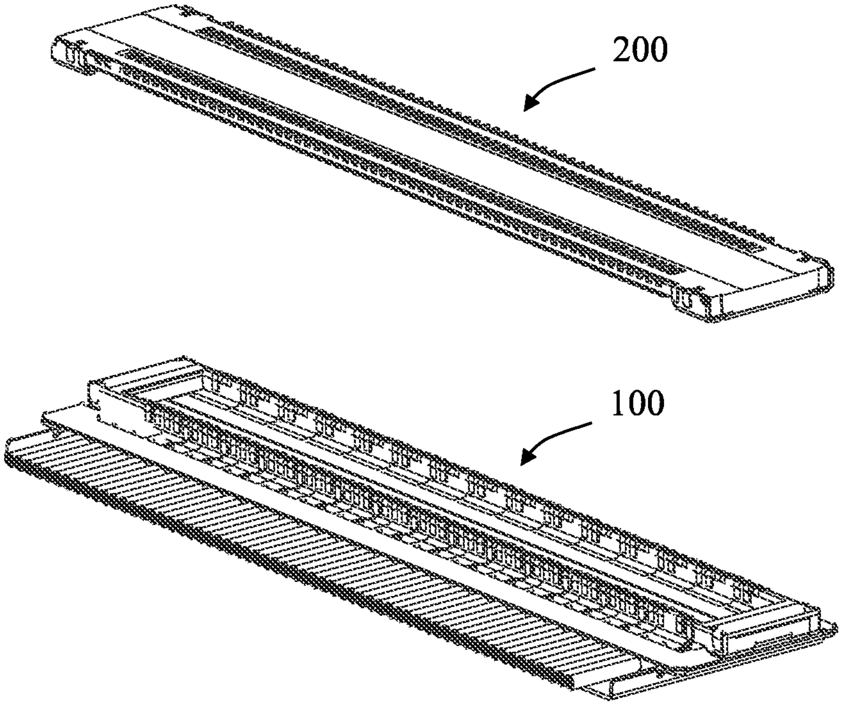
FIG. 31 is a schematic perspective view of the connector assembly in accordance with an embodiment of the present disclosure, wherein the cable connector and the board-end connector are separated from each other.

Referring to FIGS. 21 and 22, the board-end connector 200 is configured to be mounted on a circuit board 300 (as shown in FIG. 30). The board-end connector 200 includes a mating insulating body 7, a plurality of mating conductive terminals 8 fixed to the mating insulating body 7, and a fixing piece 9 fixed to the mating insulating body 7.

Referring to FIGS. 21 and 22, in an embodiment of the present disclosure, the mating insulating body 7 includes a frame body 70 located on an outer periphery, a first island portion 71 located in the frame body 70, a second island portion 72 located in the frame body 70, and a slot 73 located between the first island portion 71 and the second island portion 72. In the embodiment shown in the present disclosure, the frame body 70 includes a first wall portion 701, a second wall portion 702 opposite to the first wall portion 701, a first end portion 703 connecting one end of the first wall portion 701 and one end of the second wall portion 702, and a second end portion 704 connecting another end of the first wall portion 701 and another end of the second wall portion 702. The mating insulating body 7 includes a first receiving groove 705 located between the first wall portion 701 and the first island portion 71, and a second receiving groove 706 located between the second wall portion 702 and the second island portion 72.

The mating conductive terminals 8 include a plurality of first mating conductive terminals 81 disposed in a row and a plurality of second mating conductive terminals 82 disposed in another row. Each of the first mating conductive terminals 81 includes a substantially U-shaped first contact portion 811, a first fixing portion 812 fixed to the first wall portion 701, and a first tail portion 813 extending from the first fixing portion 812. The first contact portions 811 are exposed in the first receiving groove 705 for being mated with the cable connector 100. The first tail portions 813 are configured for being soldered or welded to the circuit board 300.

Similarly, each of the second mating conductive terminals 82 includes a substantially U-shaped second contact portion 821, a second fixing portion 822 fixed to the second wall portion 702, and a second tail portion 823 extending from the second fixing portion 822. The second contact portions 821 are exposed in the second receiving groove 706 for being mated with the cable connector 100. The second tail portions 823 are configured for being soldered or welded to the circuit board 300.

In an embodiment of the present disclosure, the first mating conductive terminals 81 and the second mating conductive terminals 82 are insert-molded with the mating insulating body 7 so as to improve the structural strength. Of course, in other embodiments, the first mating conductive terminals 81 and the second mating conductive terminals 82 can also be fixed to the mating insulating body 7 by means of assembly or the like, which is not limited in the present disclosure.

Referring to FIGS. 21 and 22, in an embodiment of the present disclosure, two fixing pieces 9 are provided, and are fixed to the first end portion 703 and the second end portion 704, respectively. In an embodiment of the present disclosure, the fixing pieces 9 are insert-molded with the mating insulating body 7 so as to improve the structural strength. Of course, in other embodiments, the fixing pieces 9 may also be fixed to the first end portion 703 and the second end portion 704 by means of assembly or the like, which is not limited in the present disclosure. The fixing pieces 9 are configured for being soldered or welded to grounding pads (not shown) of the circuit board 300, which enhances the soldering or welding strength on the one hand and improves the grounding shielding effect on the other hand.

Figure 32:
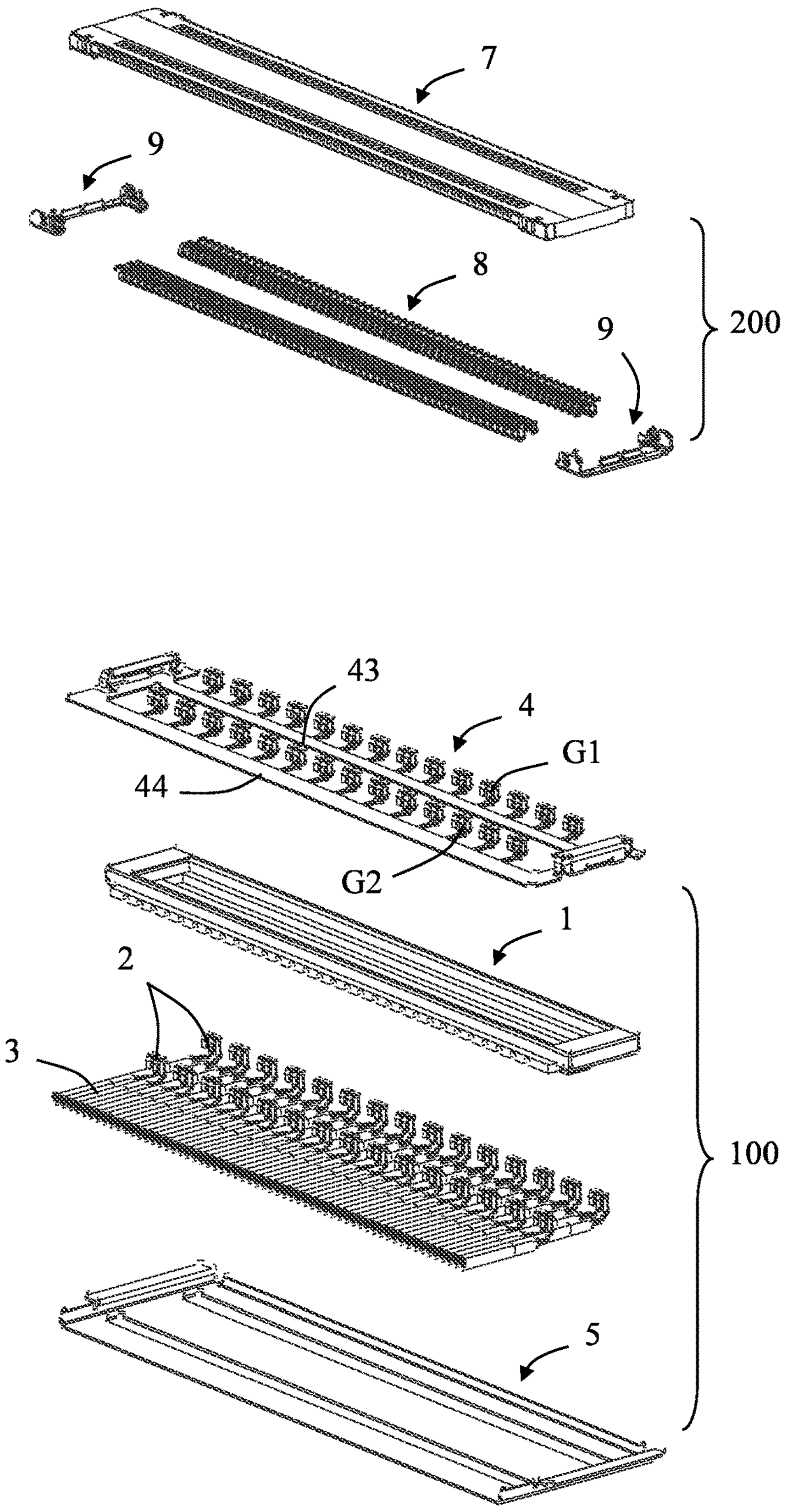
FIG. 32 is a partial perspective exploded view of FIG. 31.
Figure 33:
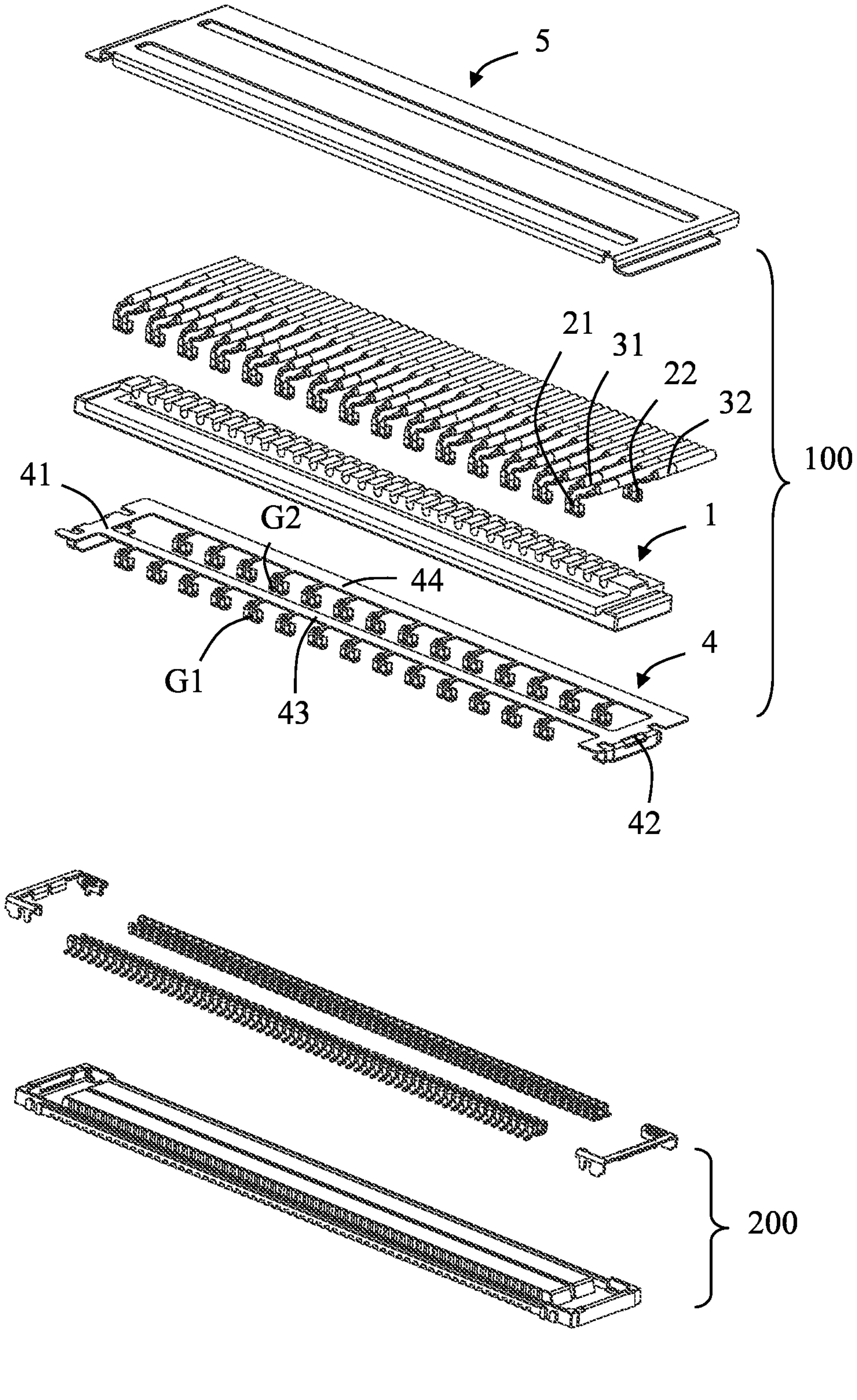
FIG. 33 is a partially exploded perspective view of FIG. 32 from another angle.
Figure 34:
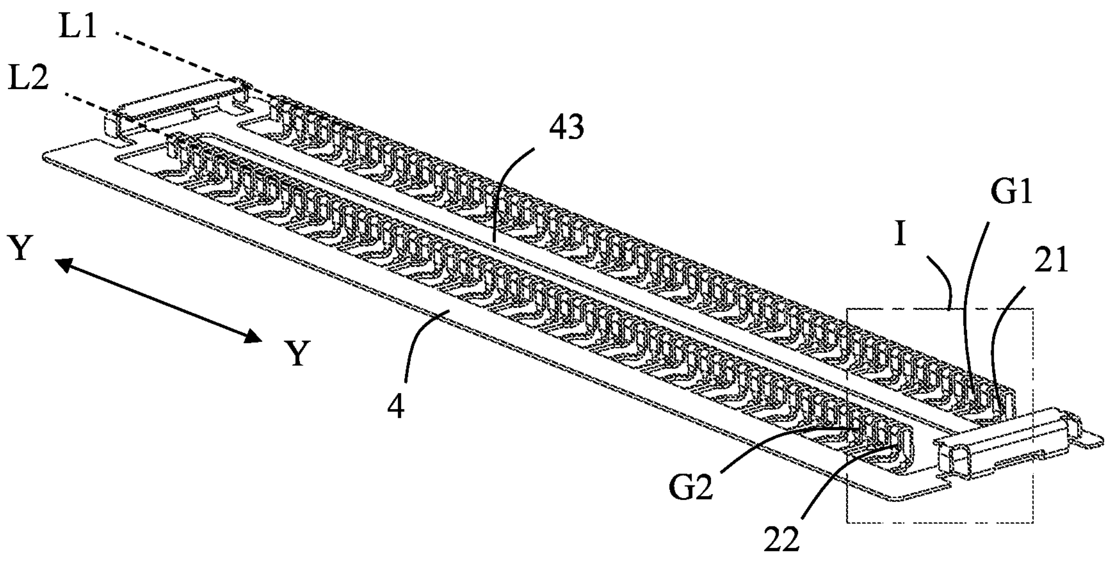
FIG. 34 is a schematic perspective view of the first cable conductive terminals, the second cable conductive terminals and the grounding shell in FIG. 31.

Referring to FIGS. 21 and 22, in an embodiment of the present disclosure, the board-end connector 200 further includes a plurality of isolation terminals 83 fixed in the mating insulating body 7. The isolation terminals 83 are located between the first mating conductive terminal 81 and the second mating conductive terminal 82 to play a certain shielding role, reduce signal crosstalk, and improve signal integrity. Specifically, in the embodiment shown in the present disclosure, each isolation terminal 83 includes a first hook portion 831, a first hook portion 831 fixed in the mating insulating body 7, a second hook portion 832 fixed in the mating insulating body 7 and opposite to the first hook portion 831, and an engaging portion 833 between the first hook portion 831 and the second hook portion 832. Each engaging portion 833 defines a groove 8331 communicating with the slot 73 to accommodate a corresponding structure of the cable connector 100 (described in detail later). Referring to FIGS. 32 and 33, in another embodiment of the board-end connector 200, the isolation terminals 83 may not be provided.

Referring to FIGS. 1 to 13, in a first embodiment of the cable connector 100 of the present disclosure, the cable connector 100 includes an insulating body 1, a plurality of cable conductive terminals 2, a plurality of cables 3, a grounding shell 4 and a metal cover 5.

Figure 5:
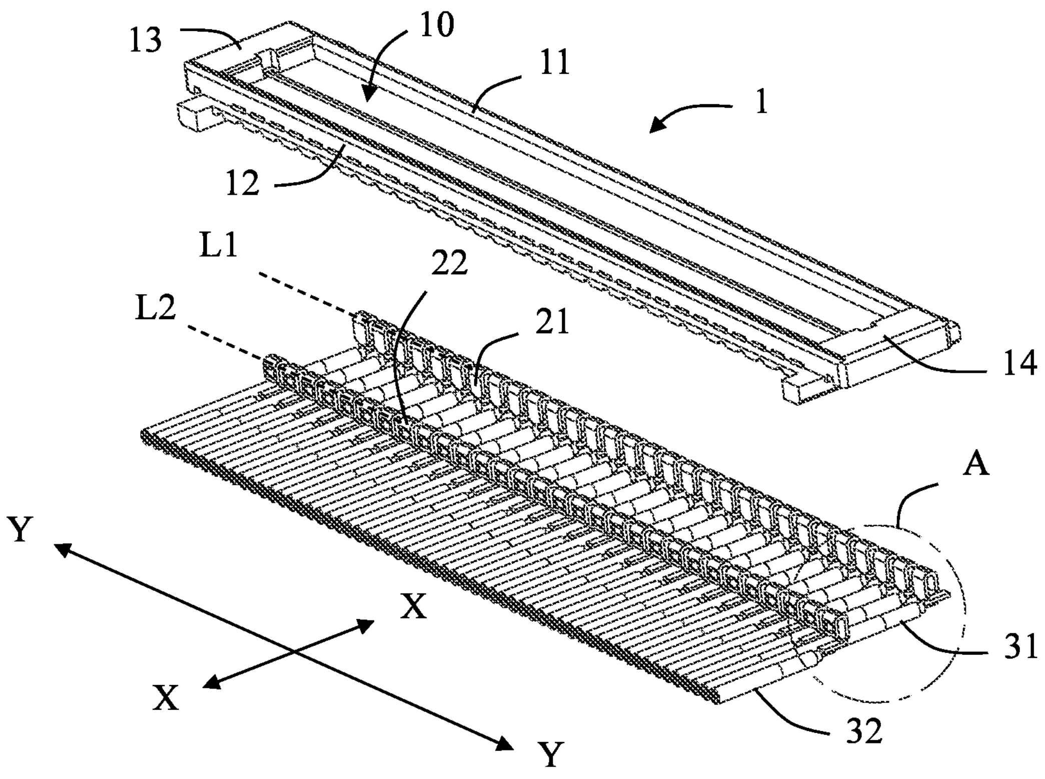
FIG. 5 is a further partial perspective exploded view after removing a grounding shell and a metal cover in FIG. 3.

Specifically, as shown in FIG. 5, the insulating body 1 extends along a first direction X-X and a second direction Y-Y. The first direction X-X is perpendicular to the second direction Y-Y. The insulating body 1 includes a first side wall 11 extending along the second direction Y-Y, a second side wall 12 extending along the second direction Y-Y, a first end wall 13 connecting one end of the first side wall 11 and one end of the second side wall 12, a second end wall 14 connecting another end of the first side wall 11 and another end of the second side wall 12, and a mating space 10 surrounded by at least the first side wall 11, the second side wall 12, the first end wall 13 and the second end wall 14. The first side wall 11 and the second side wall 12 are spaced apart in the first direction X-X. The first side wall 11 and the second side wall 12 are parallel to each other.

The plurality of cable conductive terminals 2 include a plurality of first cable conductive terminals 21 disposed in a first row L1 along the second direction Y-Y, and a plurality of second cable conductive terminals 22 disposed in a second row L2 along the second direction Y-Y. The plurality of first cable conductive terminals 21 in the first row L1 and the plurality of second cable conductive terminals 22 in the second row L2 are disposed in two rows at intervals along the first direction X-X. The plurality of first cable conductive terminals 21 in the first row L1 and the plurality of second cable conductive terminals 22 in the second row L2 are misaligned in the first direction X-X so as to reduce interference between adjacent conductive terminals. In an embodiment of the present disclosure, the plurality of first cable conductive terminals 21 in the first row L1 and the plurality of second cable conductive terminals 22 in the second row L2 are disposed in two rows parallel with each other.

Figure 6:
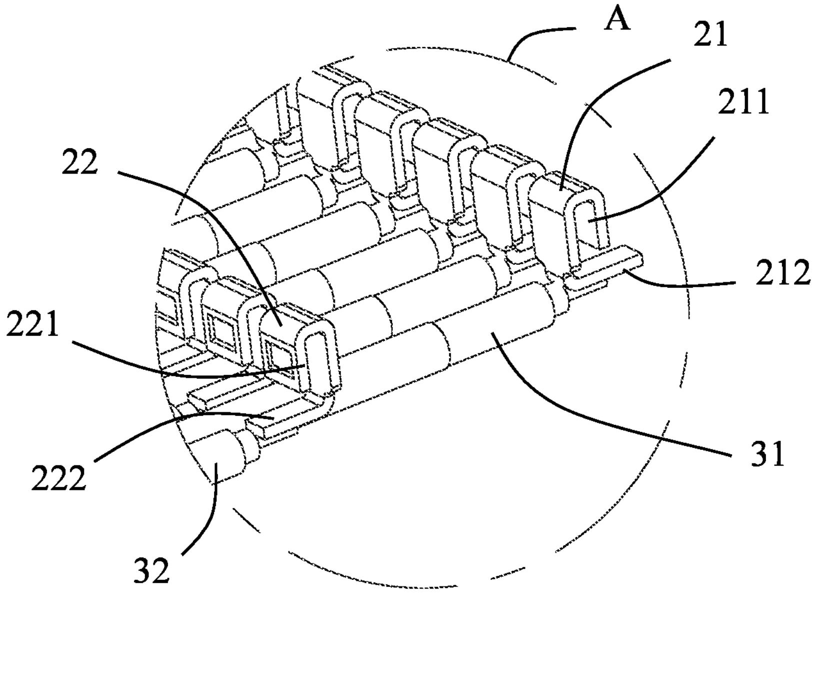
FIG. 6 is a partially enlarged view of a circled portion A in FIG. 5.

Specifically, referring to FIG. 6, each of the first cable conductive terminals 21 includes a substantially U-shaped first mating portion 211 and a first mounting portion 212 extending from the first mating portion 211. In the illustrated embodiment of the present disclosure, the first mounting portions 212 are perpendicular to the first mating portions 211. The first mating portions 211 of the first cable conductive terminals 21 are fixed to the first side wall 11 and exposed to the first side wall 11. The first mounting portions 212 of the first cable conductive terminals 21 are configured for connecting with corresponding cables 3.

Similarly, each of the second cable conductive terminals 22 includes a substantially U-shaped second mating portion 221, and a second mounting portion 222 extending from the second mating portion 221. In the embodiment shown in the present disclosure, the second mounting portions 222 are perpendicular to the second mating portions 221. The second mating portions 221 of the second cable conductive terminals 22 are fixed to the second side wall 12 and exposed to the second side wall 12. The second mounting portions 222 of the second cable conductive terminals 22 are configured for connecting with corresponding cables 3.

Figure 10:
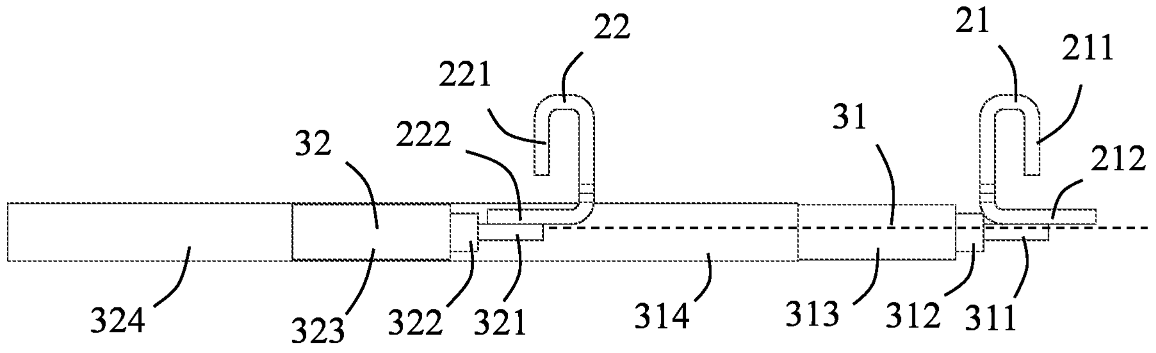
FIG. 10 is a right side view of FIG. 8.
Figure 11:
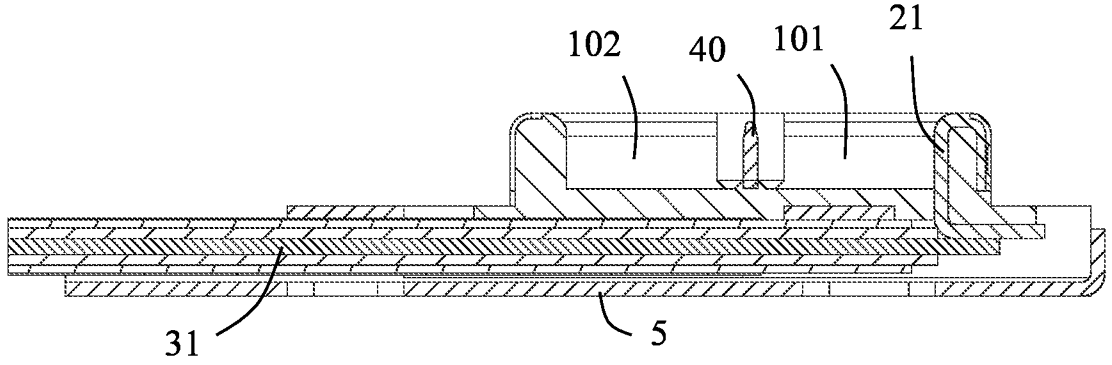
FIG. 11 is a schematic cross-sectional view taken along line C-C in FIG. 1.
Figure 12:
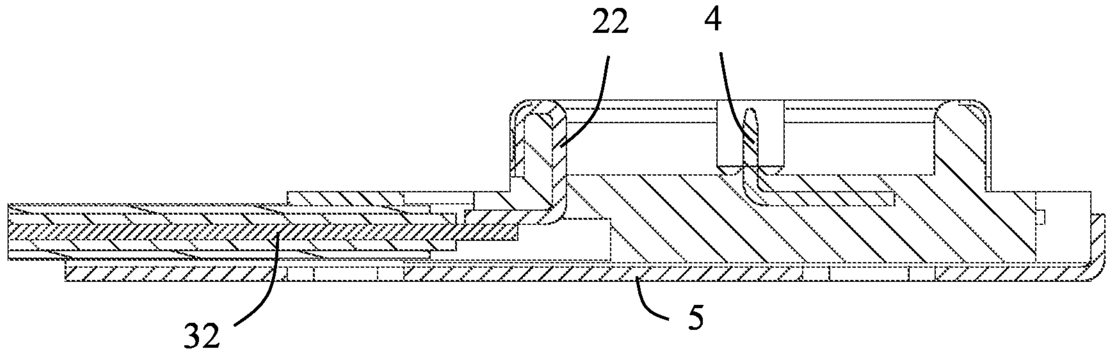
FIG. 12 is a schematic cross-sectional view taken along line D-D in FIG. 1.
Figure 13:
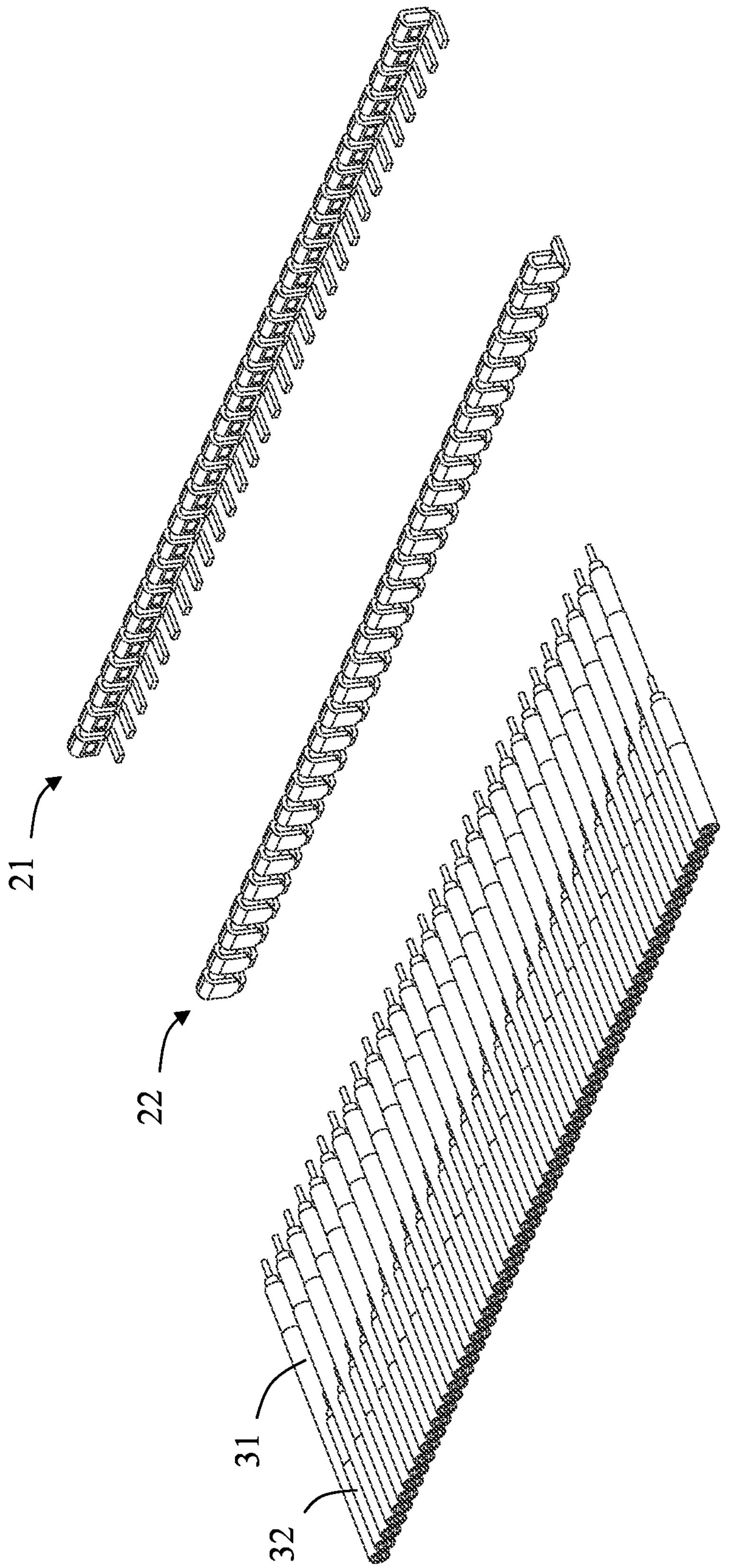
FIG. 13 is a schematic perspective view when the first cables and the second cables in FIG. 5 are separated from the first cable conductive terminals and the second cable conductive terminals, respectively.

Referring to FIG. 10, in the embodiment shown in the present disclosure, the plurality of first mounting portions 212 of the first cable conductive terminals 21 are flush with the plurality of second mounting portions 222 of the second cable conductive terminals 22. In other words, the plurality of first mounting portions 212 of the first cable conductive terminals 21 and the plurality of second mounting portions 222 of the second cable conductive terminals 22 are substantially located at the same height. This arrangement facilitates the subsequent connection (e.g., soldering or welding) of the cables 3 to the first mounting portions 212 and the second mounting portions 222. The term "flush" means that surfaces of the first mounting portions 212 and the second mounting portions 222 located on the same side are substantially at the same height, but a slight height adjustment is allowed; for example, due to the tolerance caused by the manufacturing process, as long as the tolerance is within a reasonable range; or due to the adaptive height adjustment made to adapt to different cables. For example, in an embodiment of the present disclosure, the cables may be cables with specifications between AWG 28 and AWG 40. Take AWG 32 as an example, as long as its diameter is within a reasonable range, it is considered qualified. In order to adapt to the AWG 32 cables, the heights of the first mounting portions 212 and the second mounting portions 222 may need to be slightly adjusted. Since this adjustment is small, the first mounting portions 212 and the second mounting portions 222 are still considered to be flush at this time. In the embodiment shown in the present disclosure, a bending direction of each first mounting portion 212 is opposite to a bending direction of each second mounting portion 222. In this way, the first cable conductive terminals 21 and the second cable conductive terminals 22 can share parts, thereby saving costs.

Figure 9:
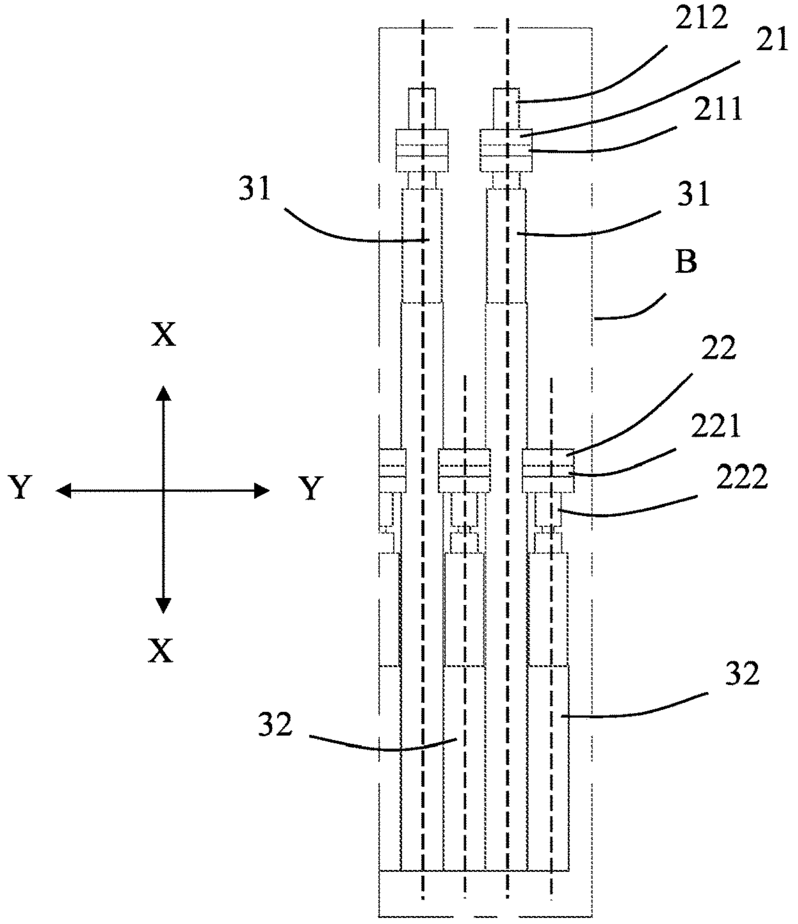
FIG. 9 is a partially enlarged view of a rectangular portion B in FIG. 8.

Referring to FIG. 9, in the first embodiment of the present disclosure, the first cable conductive terminals 21 and the second cable conductive terminals 22 are both centrally symmetric structures. That is, a center surface of the first mating portion 211 of each first cable conductive terminal 21 is aligned with a center surface of the first mounting portion 212 of each first cable conductive terminal 21. A center surface of the second mating portion 221 of each second cable conductive terminal 22 is aligned with a center surface of the second mounting portion 222 of each second cable conductive terminal 22.

The plurality of cables 3 include a plurality of first cables 31 connected to the plurality of first mounting portions 212 and a plurality of second cables 32 connected to the plurality of second mounting portions 222. Referring to FIGS. 7 to 10, in the embodiment shown in the present disclosure, the plurality of first cables 31 are arranged at intervals along the second direction Y-Y. The plurality of second cables 32 are arranged at intervals along the second direction Y-Y. One second cable 32 is disposed between any two adjacent first cables 31. One first cable 31 is disposed between any two adjacent second cables 32. Although the lengths of the first cables 31 and the second cables 32 are different, since the plurality of first mounting portions 212 of the plurality of first cable conductive terminals 21 and the plurality of second mounting portions 222 of the plurality of second cable conductive terminals 22 are located at the same height, the first cables 31 and the second cables 32 can still be located at the same height after being staggered and spaced apart from each other. This arrangement advantageously reduces the overall height of the cable connector 100.

Referring to FIG. 9, in the embodiment shown in the present disclosure, the second cable 32 located between the two adjacent first cables 31 is located in a middle of the two first cables 31, and the first cable 31 located between the two adjacent second cables 32 is located in a middle of the two second cables 31. In this way, all the first cables 31 and all the second cables 32 have a uniform distance from each other.

Figure 4:
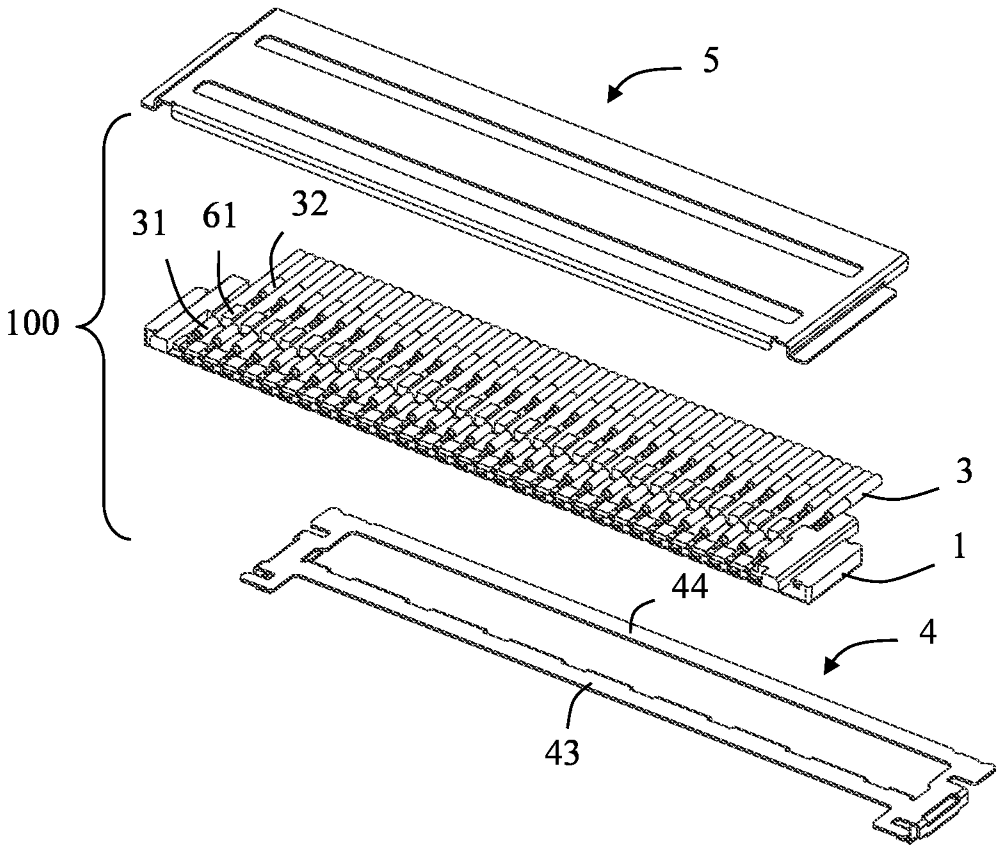
FIG. 4 is a partial perspective exploded view of FIG. 3 from another angle.
Figure 7:
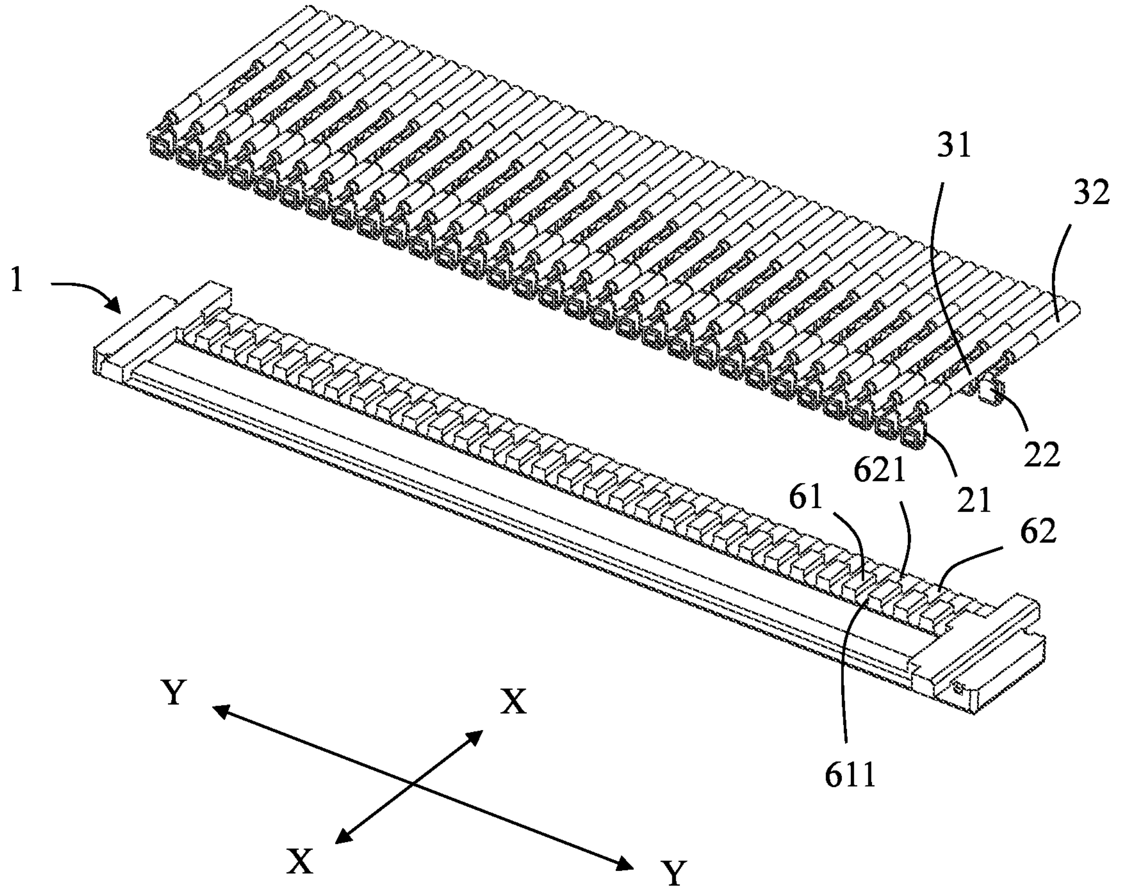
FIG. 7 is a partial perspective exploded view of FIG. 5 from another angle.
Figure 8:
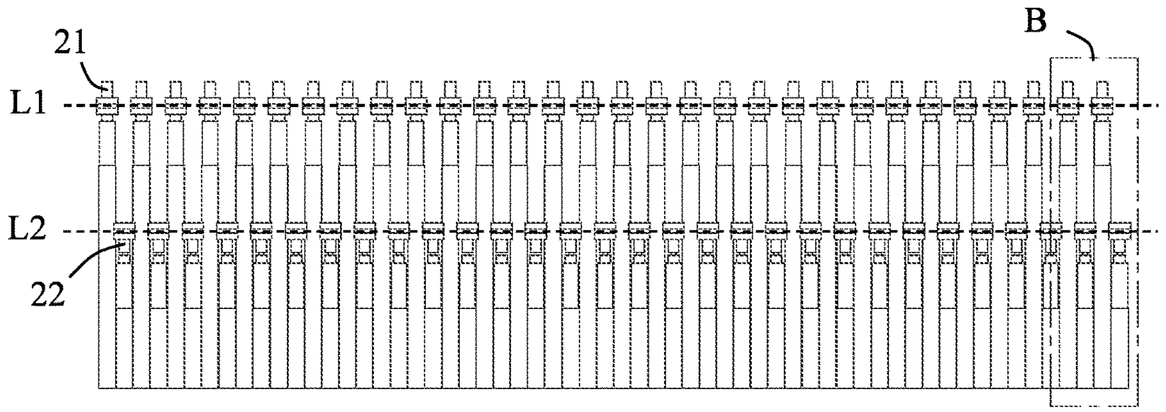
FIG. 8 is a top view when first cables and second cables in FIG. 5 are fixed with first cable conductive terminals and second cable conductive terminals, respectively.

In order to better position the first cables 31 and the second cables 32, referring to FIGS. 4 and 7, the cable connector 100 further includes a first cable positioning block 61 and a second cable positioning block 62. The first cable positioning block 61 includes a plurality of first positioning grooves 611 for positioning the first cables 31. The second cable positioning block 62 includes a plurality of second positioning grooves 621 for positioning the first cables 31. In the embodiment shown in the present disclosure, the first cables 31 are fixed to the first mounting portions 212 by soldering or welding, and the second cables 32 are fixed to the second mounting portions 222 by soldering or welding. By providing the first cable positioning block 61 and the second cable positioning block 62, it is beneficial to improve the positioning accuracy, thereby helping to improve the soldering or welding quality. It is understandable to those skilled in the art that the first cable positioning block 61 and/or the second cable positioning block 62 may be integrally formed with the insulating body 1. Alternatively, the first cable positioning block 61 and/or the second cable positioning block 62 can also be assembled and fixed with the insulating body 1. Of course, in other embodiments, the second cable positioning block 62 may also be provided with a plurality of third positioning grooves (not shown) for positioning the second cables 32, so as to improve the positioning accuracy of the second cables 32. An upper concept of the first cable positioning block 61 and the second cable positioning block 62 is a positioning block. An upper concept of the first positioning groove 611, the second positioning groove 621 and the third positioning groove is a positioning groove.

In the embodiment shown in the present disclosure, an upper surface of the positioning block is higher than the first mounting portions 212 and the second mounting portions 222. In this way, while positioning the first cables 31 and/or the second cables 32, the positioning grooves can also better ensure the soldering or welding positions of the first cables 31 and the first mounting portions 212, and the soldering or welding positions of the second cables 32 and the second mounting portions 222, thereby improving the soldering or welding quality.

Referring to FIG. 10, each first cable 31 is a coaxial cable which includes a first core 311, a first insulating layer 312 wrapped on the first core 311, a first isolation woven mesh 313 wrapped on the first insulating layer 312, and a first insulating skin 314 sleeved on the first isolation woven mesh 313. The first cores 311 are configured for being soldered or welded to the first mounting portions 212 of the first cable conductive terminals 21.

Similarly, each second cable 32 is a coaxial cable which includes a second core 321, a second insulating layer 332 wrapped on the second core 321, a second isolation woven mesh 323 wrapped on the second insulating layer 322, and a second insulating skin 324 sleeved on the second isolation woven mesh 323. The second cores 321 are configured for being soldered or welded to the second mounting portions 222 of the second cable conductive terminals 22.

Figure 3:
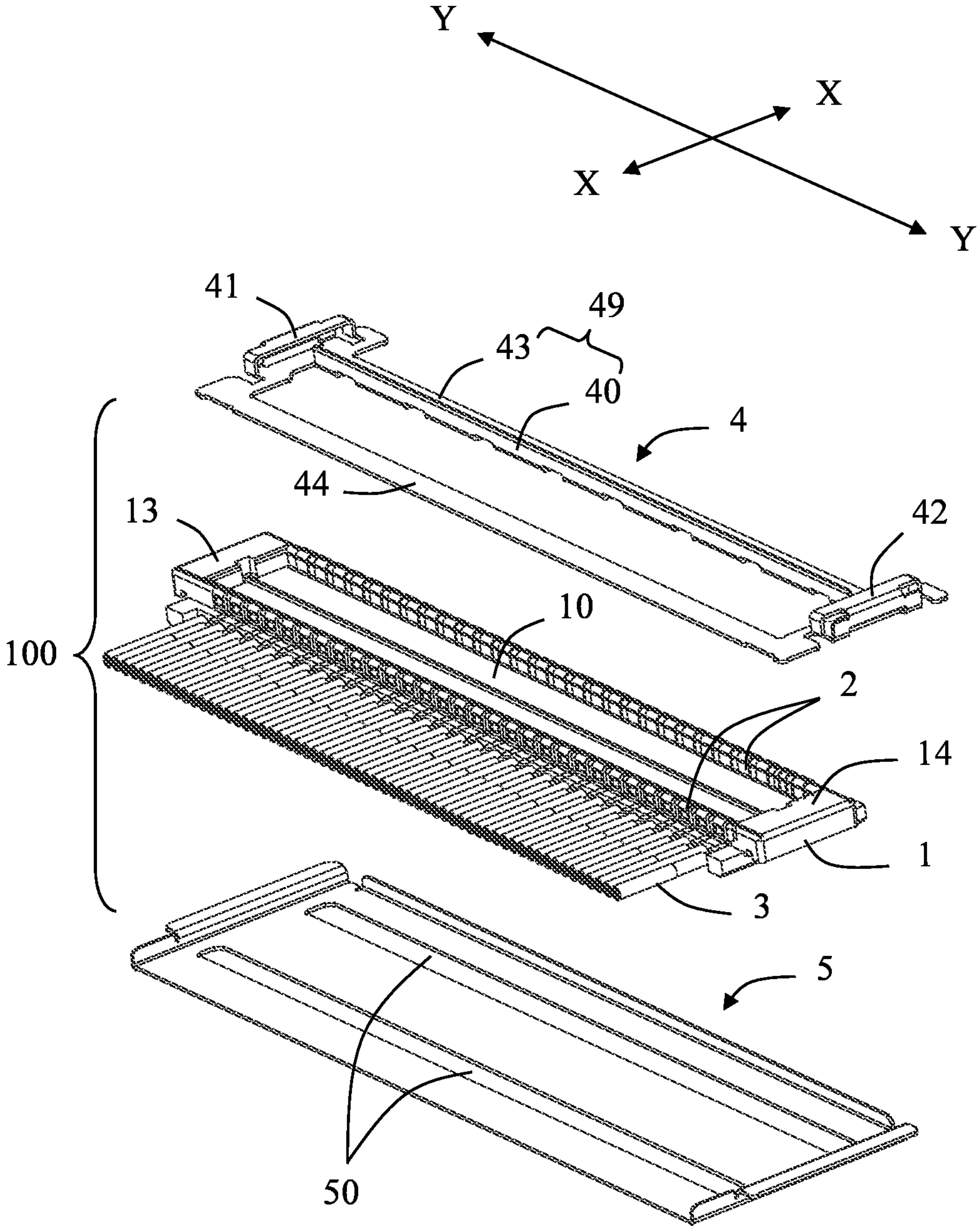
FIG. 3 is a partial perspective exploded view of FIG. 1.

Referring to FIGS. 3 and 4, in the embodiment shown in the present disclosure, the grounding shell 4 is a one-piece structure made of a metal sheet. The grounding shell 4 includes an isolating piece 40 extending along the second direction Y-Y. The isolating piece 40 is located between the first cable conductive terminals 21 of the first row L1 and the second cable conductive terminals 22 of the second row L2 along the first direction X-X. The grounding shell 4 further includes a first ground portion 41 fixed to the first end wall 13, a second ground portion 42 fixed to the second end wall 14, a first ground connection piece 43 connecting the first ground portion 41 and the second ground portion 42, and a second ground connection piece 44 connecting the first ground portion 41 and the second ground portion 42 and parallel to the first ground connection piece 43. The isolating piece 40 is located in a vertical plane and/or a horizontal plane. In the first embodiment shown in the present disclosure, the first ground connection piece 43 and the second ground connection piece 44 are located in a first plane (e.g., a horizontal plane). The isolating piece 40 is located in a second plane (e.g., a vertical plane). The first plane and the second plane are perpendicular to each other. The isolating piece 40 is vertically disposed between the plurality of first cable conductive terminals 21 of the first row L1 and the plurality of second cable conductive terminals 22 of the second row L2. In the embodiment shown in the present disclosure, the isolating piece 40 is formed by bending the first ground connection piece 43. The first ground connection piece 43, the second ground connection piece 44, the isolating piece 40, the first ground portion 41 and the second ground portion 42 are of a one-piece configuration. Referring to FIG. 1, the isolating piece 40 is located in the mating space 10. The mating space 10 is divided into a first mating space 101 located on one side of the isolating piece 40 and a second mating space 102 located on the other side of the isolating piece 40. The first mating space 101 is configured to receive the first island portion 71 of the board-end connector 200. The second mating space 102 is configured to receive the second island portion 72 of the board-end connector 200. The isolating piece 40 is configured to be inserted into the slot 73 of the board-end connector 200. The isolating piece 40 is inserted into the grooves 8331 of the isolation terminals 83 so as to be in contact with the engaging portions 833 of the insolation terminals 83. The grounding shell 4 includes an isolator 49, and the isolator 49 includes the isolating piece 40 and the first ground connection piece 43.

In order to further improve the grounding shielding effect, in the embodiment shown in the present disclosure, the first isolation woven meshes 313 of the first cables 31 are in contact with the first ground connection piece 43. The second isolation woven meshes 323 of the second cables 32 are in contact with the second ground connection piece 44. In an embodiment of the present disclosure, the first isolation woven meshes 313 of the first cables 31 are soldered or welded to the first ground connection piece 43; and the second isolation woven meshes 323 of the second cables 32 are soldered or welded to the second ground connection piece 44, so that a more stable grounding effect can be achieved. Of course, in other embodiments, the first isolation woven meshes 313 of the first cables 31 touch the first ground connection piece 43, and the second isolation woven meshes 323 of the second cables 32 touch the second ground connection piece 44. In addition, in order to prevent the first ground connection piece 43 and the second ground connection piece 44 from abutting against the first insulating skin 314 and the second insulating skin 324, resulting in soldering or welding gaps between the first ground connection piece 43 and the first isolation woven meshes 313 and soldering or welding gaps between the second ground connection piece 44 and the second isolation woven meshes 323 are too large, the first ground connection piece 43 and/or the second ground connection piece 44 may be provided with an escape portion (not shown) that deviates from a direction away from the first insulating skin 314 and/or the second insulating skin 324.

Figure 2:
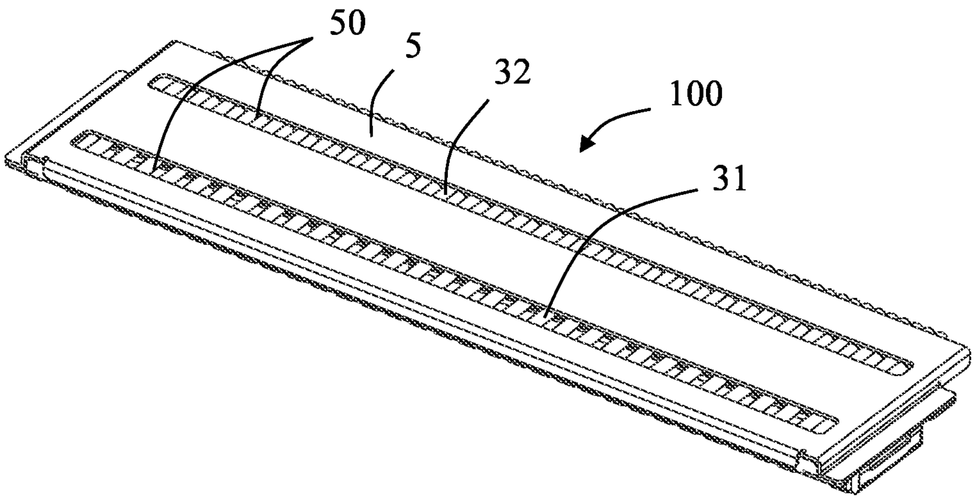
FIG. 2 is a schematic perspective view of FIG. 1 from another angle.

Referring to FIGS. 2 and 4, the metal cover 5 is mounted on the insulating body 1. The metal cover 5 is fixed with the grounding shell 4 so as to improve the grounding shielding effect. The metal cover 5 includes a hollow slot 50. The first isolation woven meshes 313 of the first cables 31 and the second isolation woven meshes 323 of the second cables 32 are at least partially exposed in the hollow slot 50. With this arrangement, on the one hand, it facilitates the inspection of the soldering or welding quality through the hollow slot 50, and on the other hand, it provides a soldering or welding space when repair soldering or welding is required.

In the first embodiment shown in the present disclosure, the first cable conductive terminals 21, the second cable conductive terminals 22 and the grounding shell 4 are insert-molded with the insulating body 1 so as to improve the overall structural strength. The second ground connection piece 44 protrudes beyond the insulating body 1 to facilitate soldering or welding with the second isolation woven meshes 323 of the second cables 32 and facilitate soldering or welding with the metal cover 5.

Figure 14:
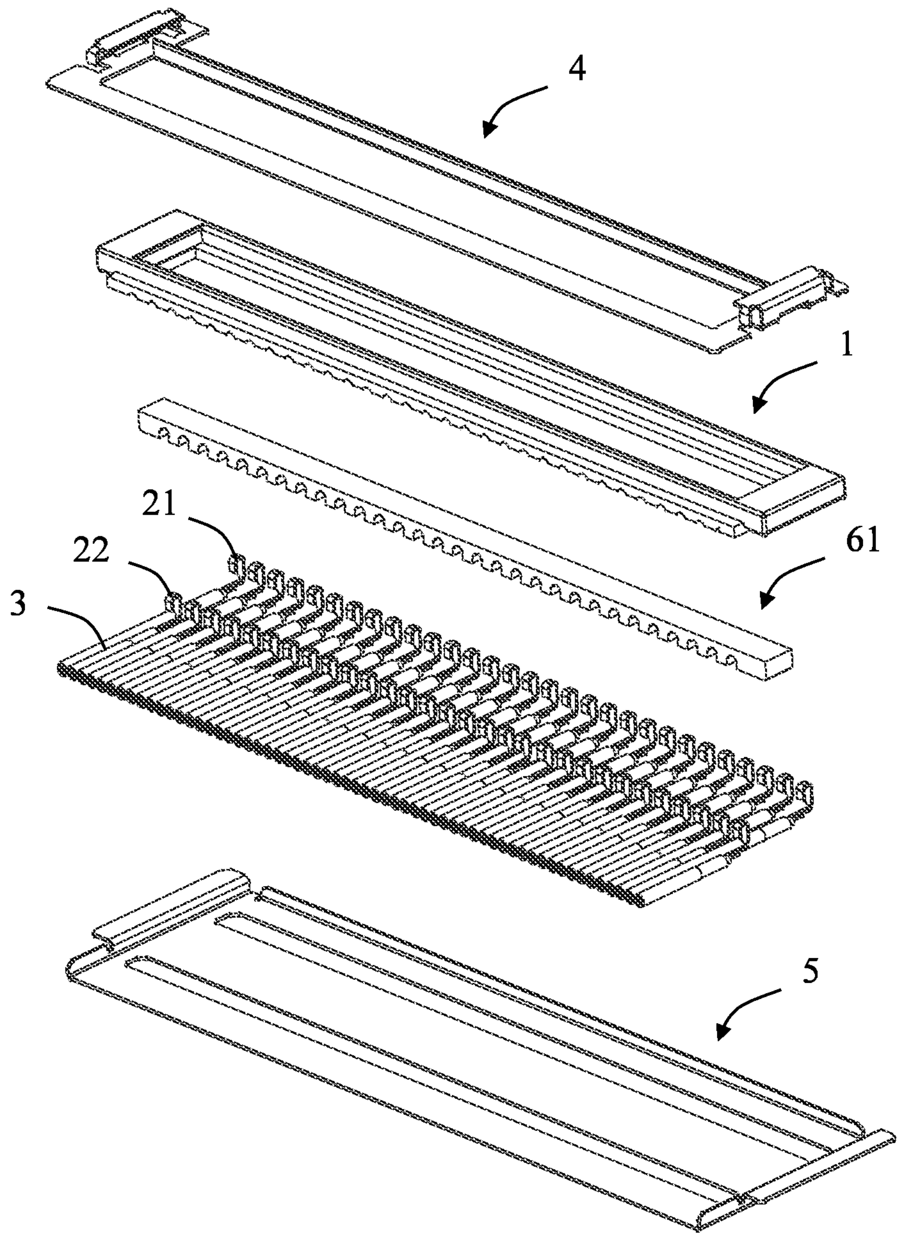
FIG. 14 is an exploded perspective view of a cable connector in accordance with a second embodiment of the present disclosure.
Figure 15:
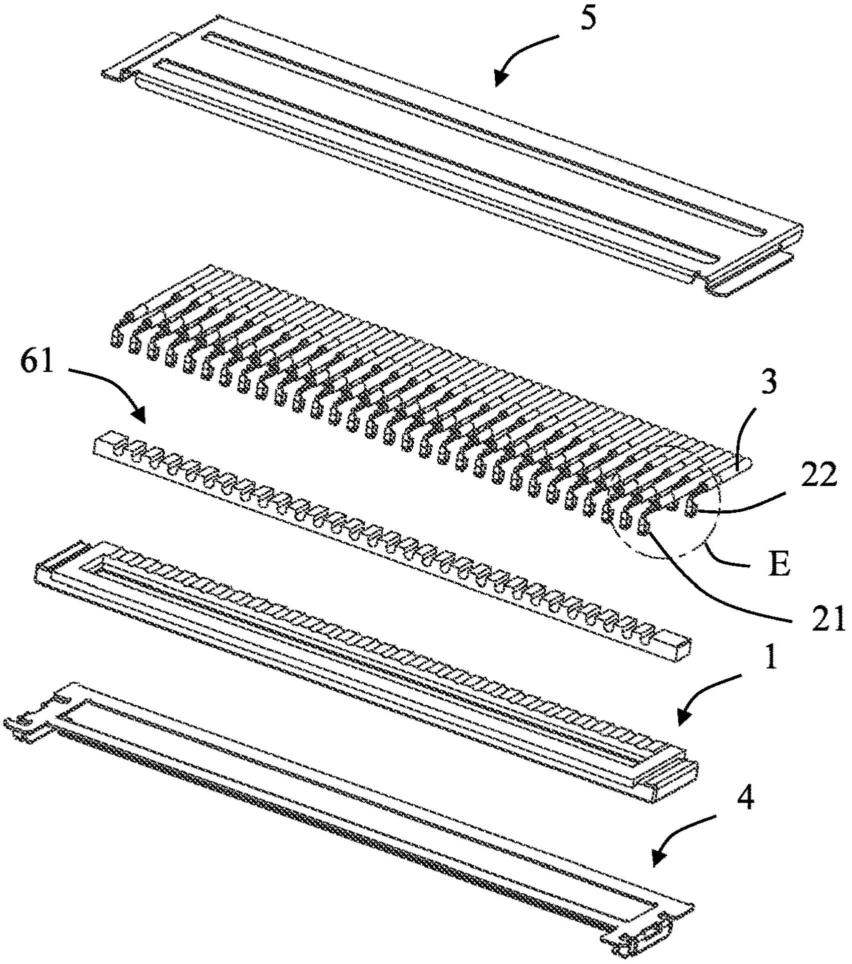
FIG. 15 is a perspective exploded view of FIG. 14 from another angle.
Figure 16:
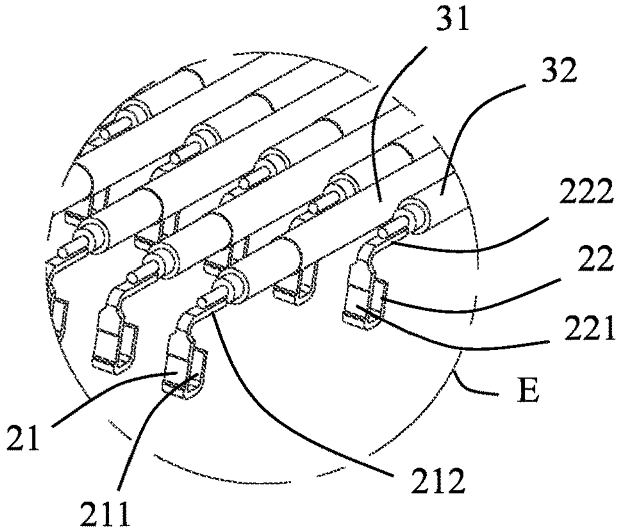
FIG. 16 is a partially enlarged view of a circled portion E in FIG. 15.
Figure 17:
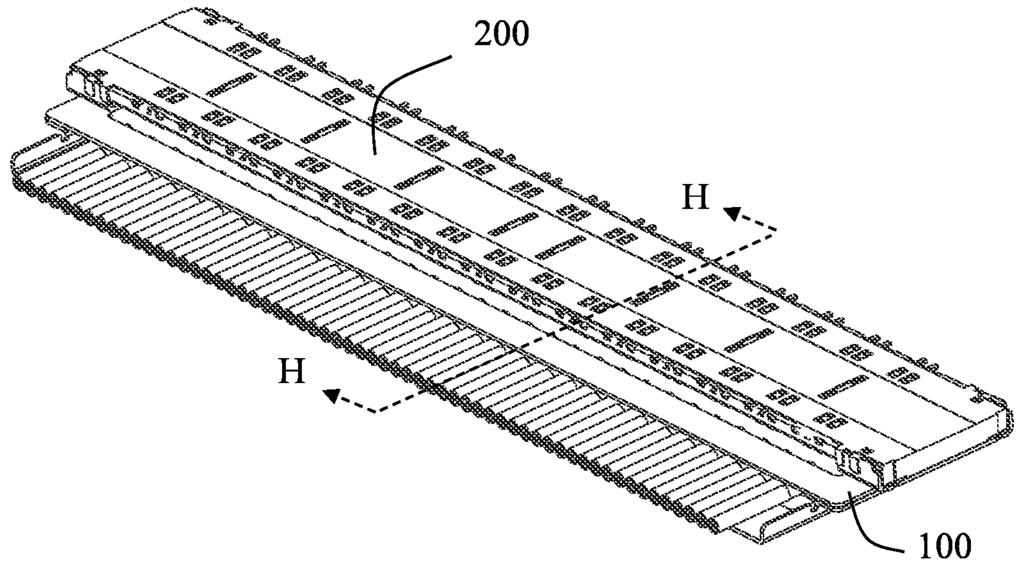
FIG. 17 is a schematic perspective view of a connector assembly which includes a cable connector in accordance with a third embodiment of the present disclosure and a board-end connector.
Figure 18:
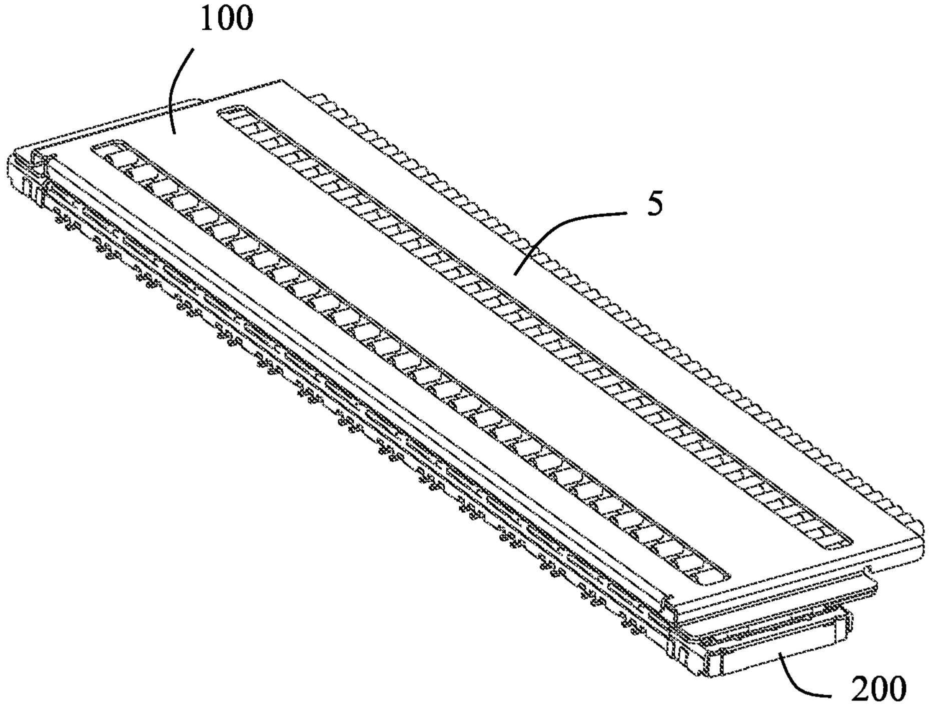
FIG. 18 is a perspective view of FIG. 17 from another angle.
Figure 19:
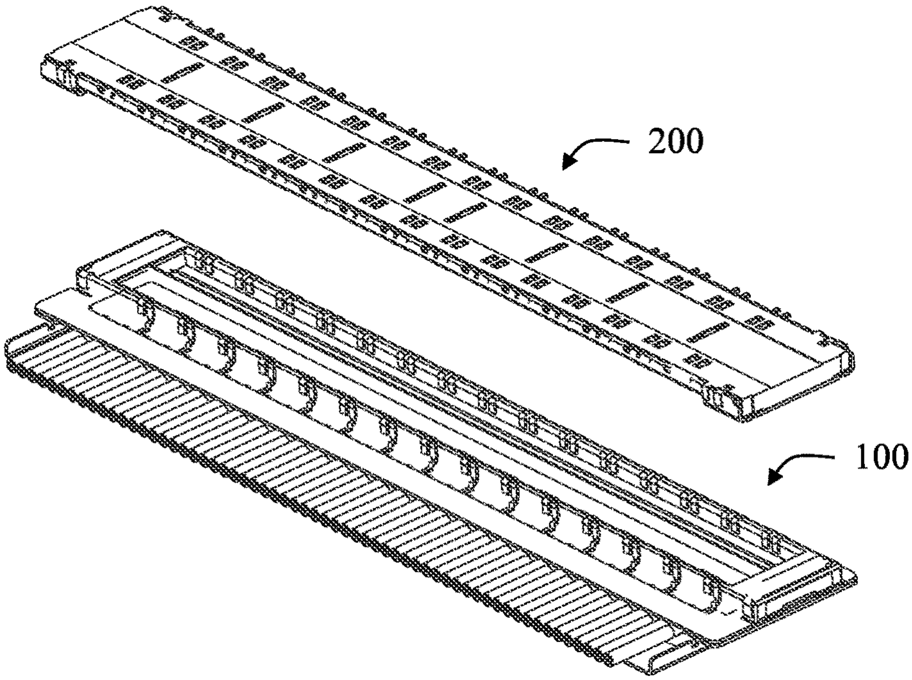
FIG. 19 is a partially exploded perspective view of FIG. 17, wherein the cable connector and the board-end connector are separated from each other.
Figure 20:
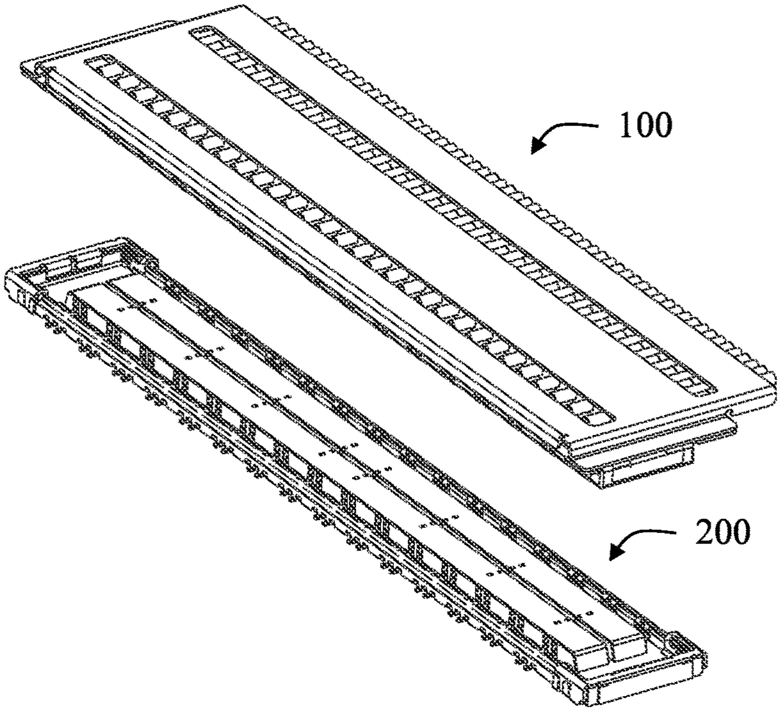
FIG. 20 is a partially exploded perspective view of FIG. 19 from another angle.

FIGS. 14 to 16 illustrate a cable connector 100 in accordance with a second embodiment of the present disclosure.

The main difference between the cable connector 100 in the second embodiment and the cable connector 100 in the first embodiment is the bending direction of the first mounting portions 212 of the first cable conductive terminals 21 and the bending direction of the second mounting portions 222 of the second cable conductive terminals 22. Specifically, in the second embodiment of the cable connector 100 of the present disclosure, the bending direction of the first mounting portions 212 is the same as the bending direction of the second mounting portions 222.

FIGS. 23 to 30 illustrate a cable connector 100 in accordance with a third embodiment of the present disclosure. The main difference between the cable connector 100 in the third embodiment and the cable connector 100 in the first embodiment is the shape of the first cable conductive terminals 21 and the second cable conductive terminals 22. Specifically, referring to FIGS. 26 and 29, in the third embodiment of the cable connector 100 of the present disclosure, the plurality of first cable conductive terminals 21 includes a plurality of first signal terminals S1 and a plurality of second signal terminals S2. The first signal terminal S1 and the second signal terminal S2 located side by side and adjacent to the first signal terminal S1 form a first differential pair DP1 (Differential Pair). The plurality of second cable conductive terminals 22 include a plurality of third signal terminals S3 and a plurality of fourth signal terminals S4. The third signal terminal S3 and the fourth signal terminal S4 located side by side and adjacent to third signal terminal S3 form a second differential pair DP2 (Differential Pair). The first differential pairs DP1 and the second differential pairs DP2 are misaligned in the first direction X-X.

The first mating portion 211 of each first cable conductive terminal 21 is U-shaped. Each first cable conductive terminal 21 includes a first inclined portion 213 connecting the first mating portion 211 and the first mounting portion 212, so that a center surface of the first abutting portion 211 and a center surface of the first mounting portion 212 are misaligned from each other. In the first differential pair DP1, the first inclined portion 213 of the first signal terminal S1 is inclined in a direction away from the second signal terminal S2. The first inclined portion 213 of the second signal terminal S2 is inclined in a direction away from the first signal terminal S1. In this way, a distance between the first mounting portion 212 of the first signal terminal S1 and the first mounting portion 212 of the second signal terminal S2 along the second direction Y-Y is greater than a distance between the first mating portion 211 of the first signal terminal S1 and the first mating portion 211 of the second signal terminal S2 along the second direction Y-Y.

Figure 26:
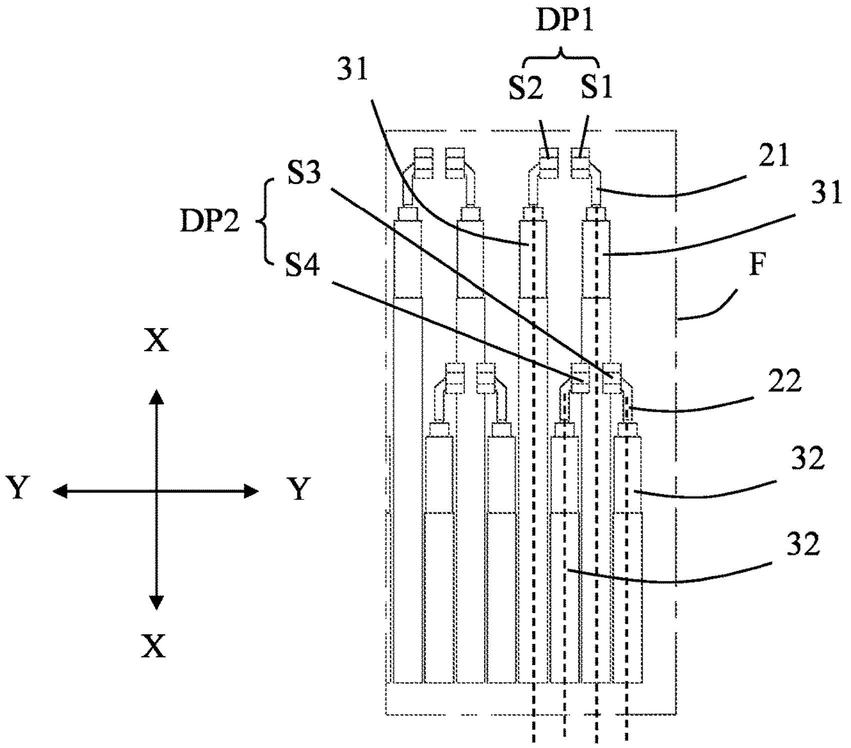
FIG. 26 is a partially enlarged view of a rectangular portion F in FIG. 25.
Figure 27:
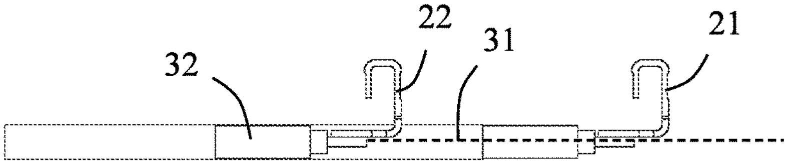
FIG. 27 is a right side view of FIG. 25.
Figure 28:
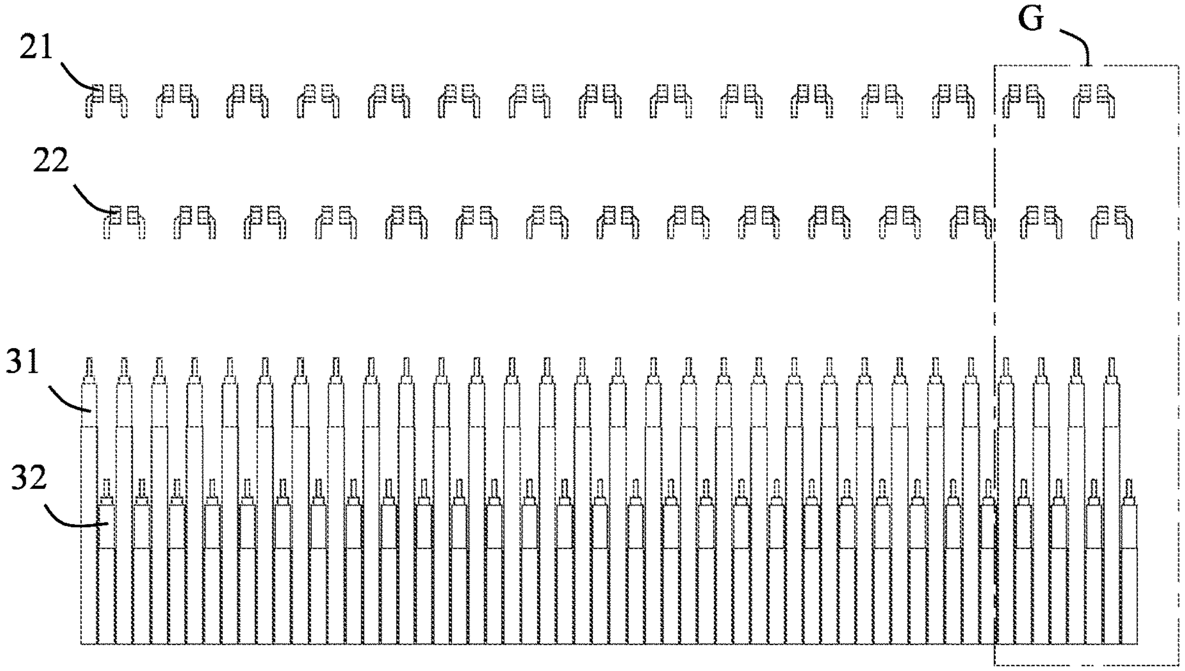
FIG. 28 is an exploded view of FIG. 15.
Figure 29:
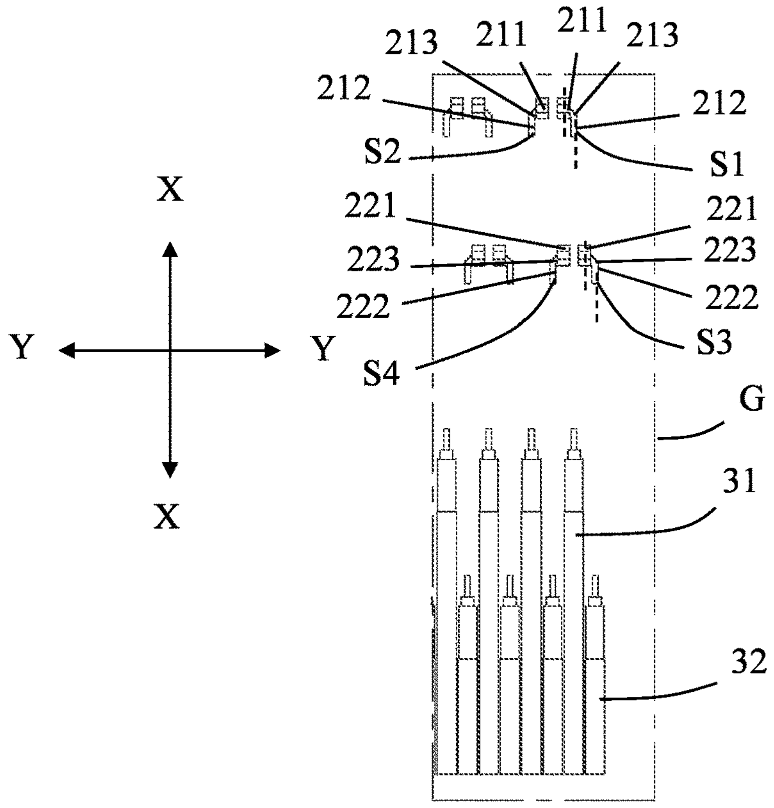
FIG. 29 is a partially enlarged view of a rectangular portion G in FIG. 28.

Referring to FIG. 26, in the embodiment shown in the present disclosure, a center line of the first cable 31, corresponding to the second differential pair DP2, is located at a middle of the second differential pair DP2. Similarly, a center line of the second cable 32, corresponding to the first differential pair DP1, is located at a middle of the first differential pair DP1.

Similarly, the second mating portion 221 of each second cable conductive terminal 22 is U-shaped. Each second cable conductive terminal 22 includes a second inclined portion 223 connecting the second mating portion 221 and the second mounting portion 222, so that a center surface of the second mating portion 221 and a center surface of the second mounting portion 222 are misaligned from each other. In the second differential pair DP2, the second inclined portion 223 of the third signal terminal S3 is inclined in a direction away from the fourth signal terminal S4. The second inclined portion 223 of the fourth signal terminal S4 is inclined in a direction away from the third signal terminal S3. In this way, a distance between the second mounting portion 222 of the third signal terminal S3 and the second mounting portion 222 of the fourth signal terminal S4 along the second direction Y-Y is greater than a distance between the second mating portion 221 of the third signal terminal S3 and the second mating portion 221 of the fourth signal terminal S4 along the second direction Y-Y.

Referring to FIGS. 23 to 30, in the third embodiment of the cable connector 100 of the present disclosure, by arranging the first cable conductive terminals 21 and the second cable conductive terminals 22 as described above, the distance between the mating portions can be shortened and the distance between the differential pairs can be increased, thereby improving the signal integrity of the differential pairs when transmitting high-frequency signals.

FIGS. 31 to 37 illustrate another embodiment of the connector assembly of the present disclosure, wherein the board-end connector 200 does not have the isolation terminals 83. FIGS. 31 to 37 illustrate a fourth embodiment of the cable connector 100 of the present disclosure. The main difference between the cable connector 100 in the fourth embodiment and the cable connector 100 in the third embodiment is the structure of the grounding shell 4. Specifically, in the fourth embodiment of the cable connector 100 of the present disclosure, the grounding shell 4 includes a plurality of first ground terminals G1 integrally extending from the grounding shell 4, and a plurality of second ground terminals G2 integrally extending from the grounding shell 4. The first ground terminals G1 are located in the first row L1 and beside the first differential pair DP1. The second ground terminals G2 are located in the second row L2 and beside the second differential pair DP2. The width of the first ground terminal G1 and/or the second ground terminal G2 along the second direction Y-Y may be respectively set to be the same as the width of the signal terminal. In the embodiment shown in the present disclosure, the pitches between any two adjacent terminals among the first ground terminals G1, the first signal terminals S1 and the second signal terminals S2 are equal. The pitches between any two adjacent terminals of the second ground terminals G2, the third signal terminals S3 and the fourth signal terminals S4 are also equal.

Figure 38:
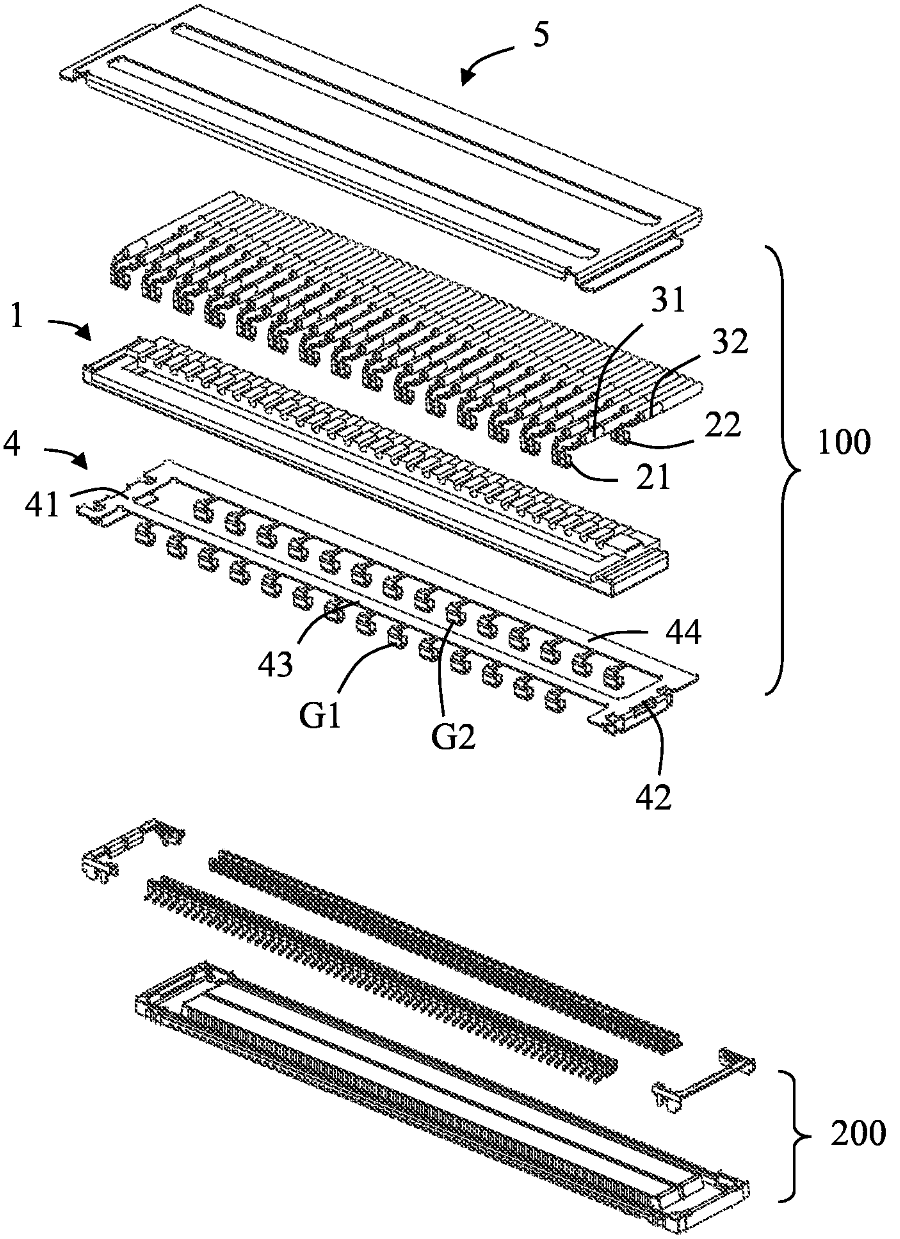
FIG. 38 is a partially exploded perspective view of a cable connector in accordance with a fourth embodiment of the present disclosure.
Figure 39:
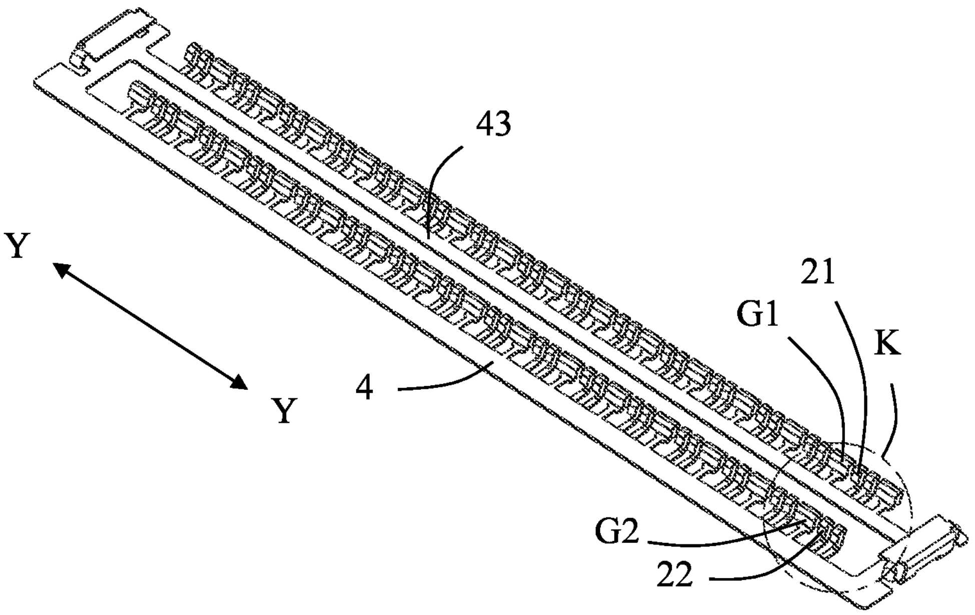
FIG. 39 is a schematic perspective view of the first cable conductive terminals, the second cable conductive terminals and the grounding shell in FIG. 38.
Figure 40:
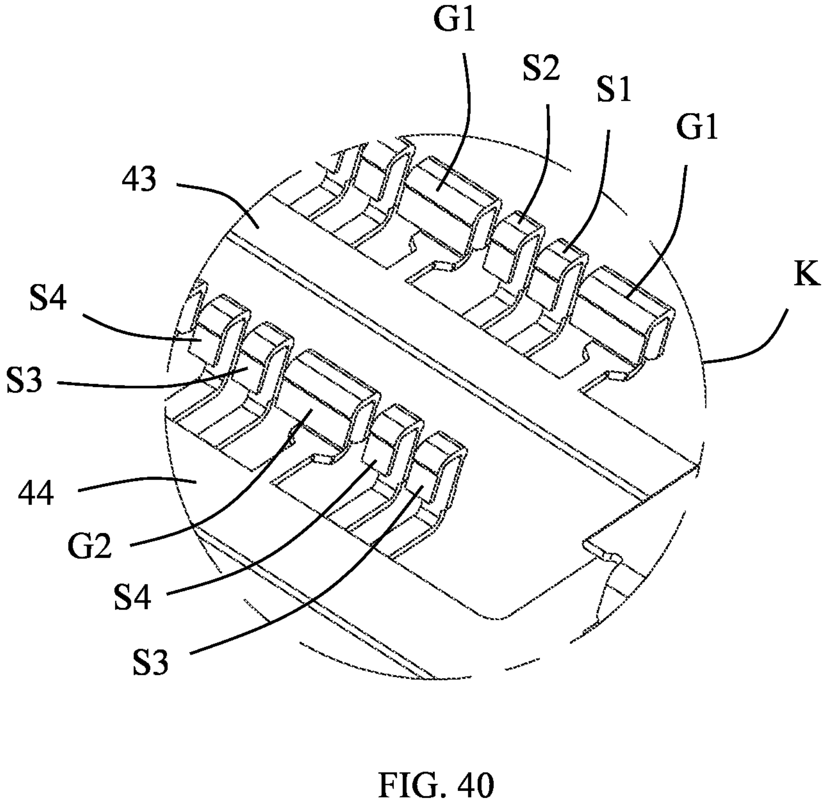
FIG. 40 is a partially enlarged view of a circled portion K in FIG. 39.
Figure 41:
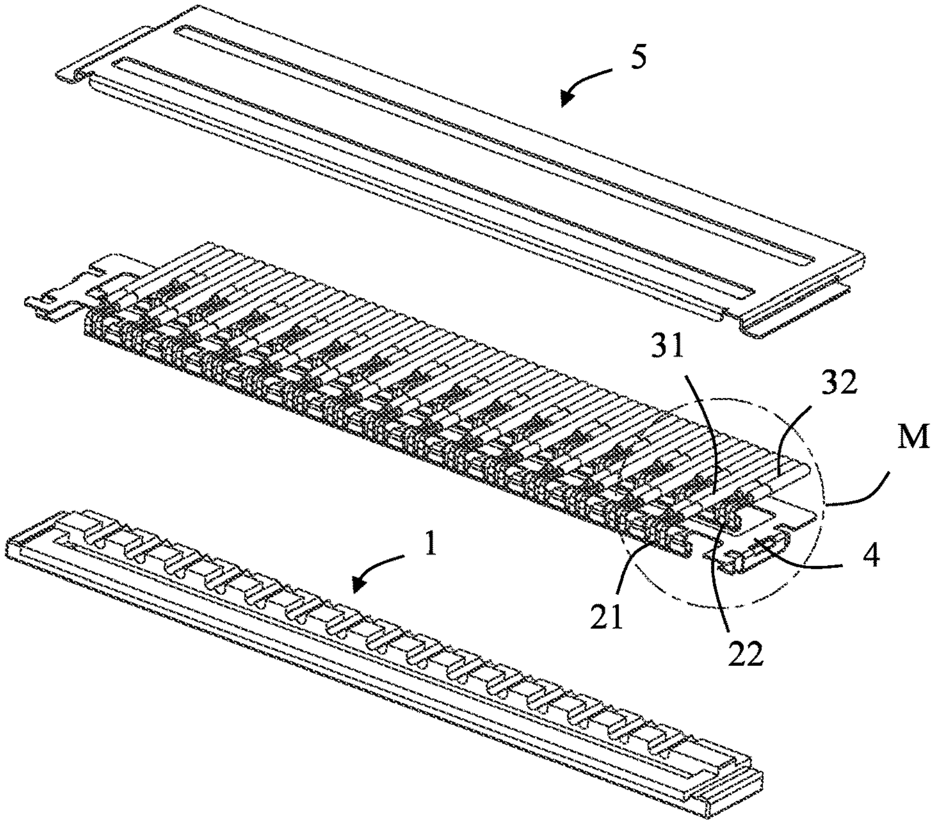
FIG. 41 is a partially exploded perspective view of the cable connector in accordance with a fifth embodiment of the present disclosure.
Figure 42:
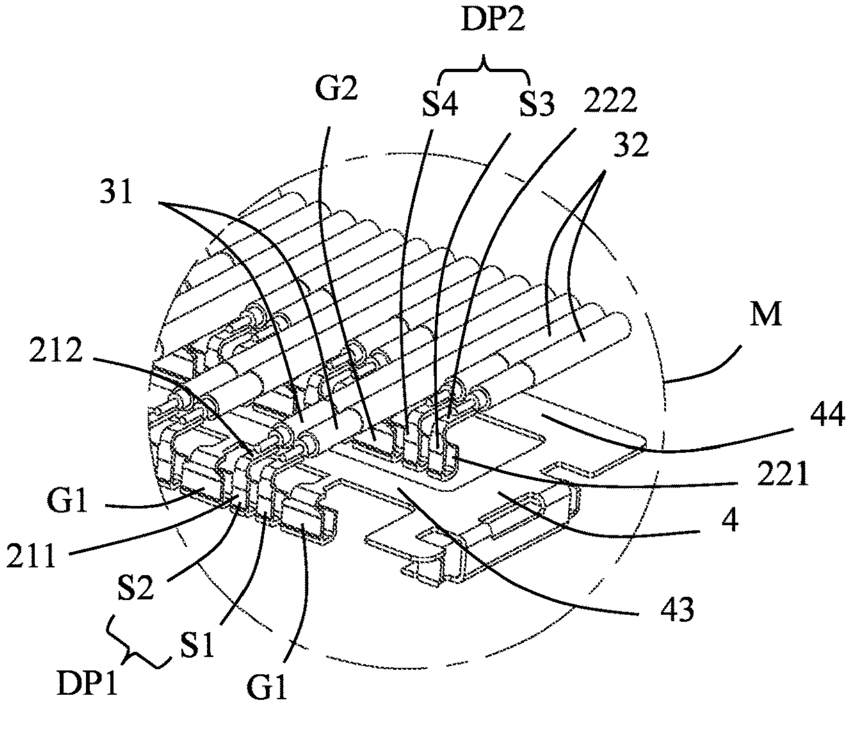
FIG. 42 is a partially enlarged view of a circled portion M in FIG. 41.
Figure 43:
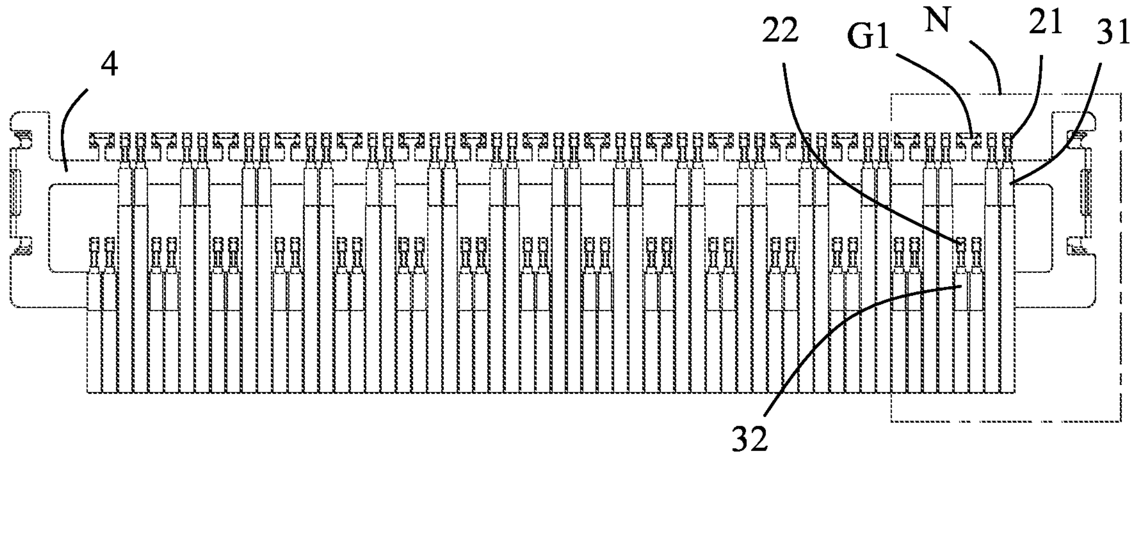
FIG. 43 is a top view of the first cable conductive terminals, the second cable conductive terminals, the first cables, the second cables and the grounding shell in FIG. 41 after assembly.
Figure 44:
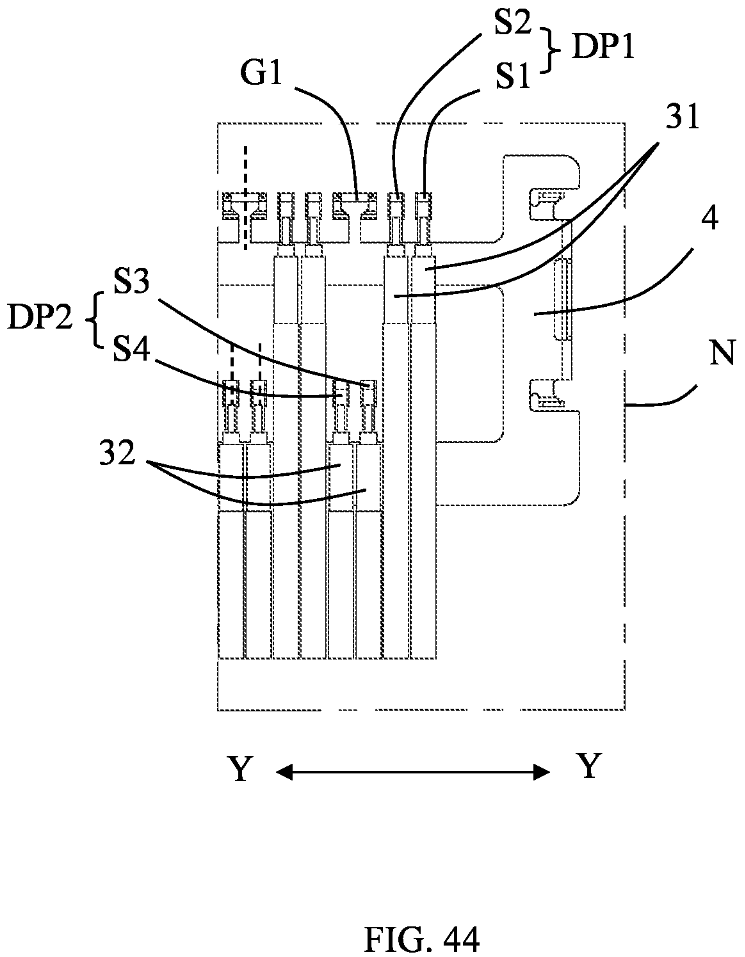
FIG. 44 is a partially enlarged view of a rectangular portion N in FIG. 43.

Referring to FIGS. 38 to 40, in the fourth embodiment of the cable connector 100 of the present disclosure, the width of the first ground terminal G1 and/or the second ground terminal G2 along the second direction Y-Y may be respectively set to be larger than the width of the signal terminal. For example, the width of the first ground terminal G1 along the second direction Y-Y is greater than or equal to twice the width of the first signal terminal S1. The width of the first ground terminal G1 along the second direction Y-Y is greater than or equal to twice the width of the second signal terminal S2. The width of the second ground terminal G2 along the second direction Y-Y is greater than or equal to twice the width of the third signal terminal S3. The width of the second ground terminal G2 along the second direction Y-Y is greater than or equal to twice the width of the fourth signal terminal S4. In this way, by appropriately increasing the widths of the first ground terminal G1 and the second ground terminal G2, the signal terminals can be better shielded, thereby improving the signal transmission quality.

Figure 35:
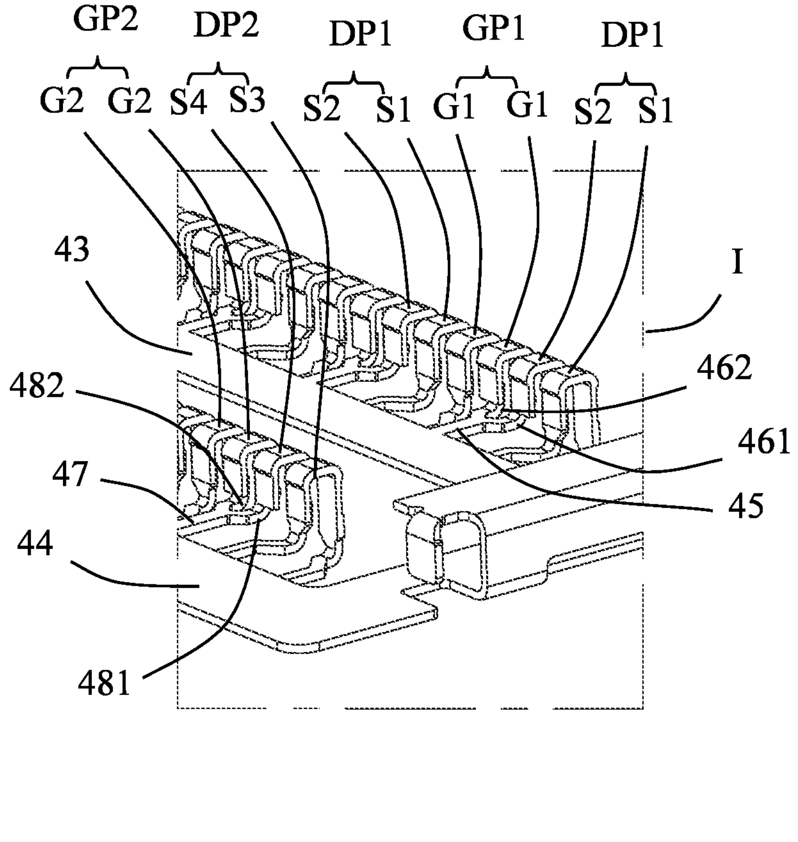
FIG. 35 is a partially enlarged view of a rectangular portion I in FIG. 34.
Figure 36:
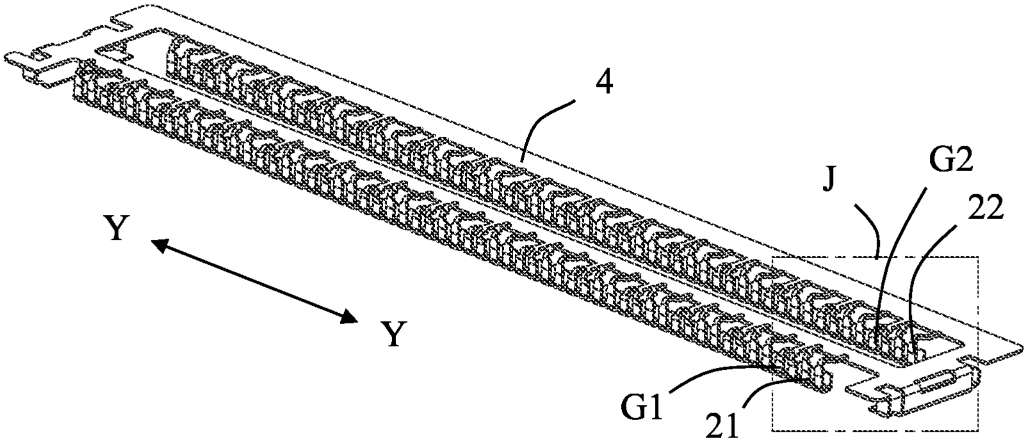
FIG. 36 is a perspective view of FIG. 34 from another angle.
Figure 37:
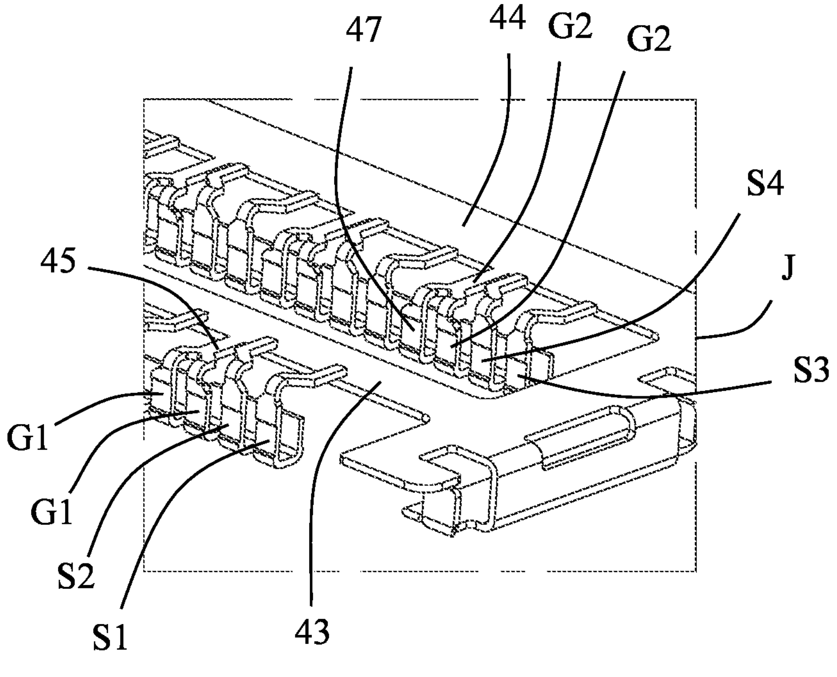
FIG. 37 is a partially enlarged view of a rectangular portion J in FIG. 36.

Referring to FIGS. 35 to 37, in the embodiment shown in the present disclosure, the plurality of first ground terminals G1 are provided. Two first ground terminals G1 are disposed between two adjacent first differential pairs DP1. The two first ground terminals G1 constitute a first ground terminal group GP1. Similarly, the plurality of second ground terminals G2 are provided. Two second ground terminals G2 are disposed between two adjacent second differential pairs DP2. The two second ground terminals G2 constitute a second ground terminal group GP2. The first ground terminal groups GP1 and the first differential pairs DP1 are arranged alternately. The second ground terminal groups GP2 and the second differential pairs DP2 are arranged alternately.

Each of the first ground terminal groups GP1 includes a first base portion 45, a first bifurcated portion 461 connected to the first base portion 45, and a second bifurcated portion 462 connected to the first base portion 45. The two first ground terminals G1 in the first ground terminal group GP1 are connected to the first bifurcated portion 461 and the second bifurcated portion 462, respectively.

Similarly, each of the second ground terminal groups GP2 includes a second base portion 47, a third bifurcated portion 481 connected to the second base portion 47, and a fourth bifurcated portion 482 connected to the second base portion 47. The two second ground terminals G2 in the second ground terminal group GP2 are connected to the third bifurcated portion 481 and the fourth bifurcated portion 482, respectively.

In addition, it is understandable to those skilled in the art that the plurality of first ground terminals G1 are provided. Only one first ground terminal G1 is provided between two adjacent first differential pairs DP1. A plurality of the second ground terminal G2 are provided. Only one second ground terminal G2 is provided between two adjacent second differential pairs DP2.

FIGS. 41 to 44 illustrate a fifth embodiment of the cable connector 100 of the present disclosure. The differences between the cable connector 100 in the fifth embodiment and the cable connector 100 in the fourth embodiment are the structures of the first signal terminals S1, the second signal terminals S2, the third signal terminals S3 and the fourth signal terminals S4, as well as the arrangement of the first cables 31 and the second cables 32.

Specifically, each of first cable conductive terminals 21 has a center-symmetric structure. That is, a center surface of the first mating portion 211 of the first cable conductive terminal 21 is aligned with a center surface of the first mounting portion 212 of the first cable conductive terminal 21. A center surface of the second mating portion 221 of the second cable conductive terminal 22 is aligned with a center surface of the second mounting portion 222 of the second cable conductive terminal 22. In this way, the deflection of the first mounting portion 212 of the first cable conductive terminal 21 relative to the first mating portion 211 of the first cable conductive terminal 21 can be reduced or even avoided; and the deflection of the second mounting portion 222 of the second cable conductive terminal 22 relative to the second mating portion 221 of the second cable conductive terminal 22 can also be reduced or even avoided. Therefore, it is beneficial to reduce the manufacturing difficulty of the cable conductive terminals 2.

Referring to FIGS. 41 to 44, the widths of the first ground terminal G1 and/or the second ground terminal G2 along the second direction Y-Y can be respectively set to be larger than the width of the signal terminals. For example, the width of the first ground terminal G1 along the second direction Y-Y is greater than or equal to twice the width of the first signal terminal S1, the width of the first ground terminal G1 along the second direction Y-Y is greater than or equal to twice the width of the second signal terminal S2, the width of the second ground terminal G2 along the second direction Y-Y is greater than or equal to twice the width of the third signal terminal S3, and the width of the second ground terminal G2 along the second direction Y-Y is greater than or equal to twice the width of the fourth signal terminal S4. In this way, by appropriately increasing the widths of the first ground terminal G1 and the second ground terminal G2, the signal terminals can be better shielded, thereby improving the signal transmission quality.

A width occupied by each first differential pair DP1 of the first cable conductive terminals 21 along the second direction Y-Y is approximately the same as a width occupied by the second ground terminal G2 corresponding to the first differential pair DP1 along the second direction Y-Y. In this way, when the first cables 31 are connected to the first differential pair DP1, the first cables 31 can make full use of the width of the second ground terminal G2, so as to avoid interference between the first cables 31 and the adjacent second cables 32. In other words, referring to FIGS. 41 to 44, in the fifth embodiment of the cable connector 100 of the present disclosure, the two first cables 31 connected to the first differential pair DP1 form a first group, and the two second cables 32 connected to the second differential pair DP2 constitute a second group. The first cables 31 of the first group and the second cables 32 of the second group are arranged alternately along the second direction Y-Y. In the fourth embodiment of the cable connector 100 of the present disclosure, the grounding shell 4 is not provided with an integrally formed isolating piece 40. Instead, the grounding shell 4 is provided with at least one first ground terminal G1 and at least one second ground terminal G2. By disposing the first ground terminal G1 on at least one side of the first differential pair DP1 in the first row L1, the signal integrity of the first differential pair DP1 when transmitting high-frequency signals is improved. By disposing the second ground terminal G2 on at least one side of the second differential pair DP2 in the second row L2, the signal integrity of the second differential pair DP2 when transmitting high-frequency signals is improved.

It is understandable to those skilled in the art that the board-end connector 200 shown in FIGS. 32 and 33 can also be provided with a plurality of isolation terminals 83 as shown in FIGS. 21 and 22. By connecting the isolation terminals 83 to grounding pads (not shown) of the circuit board 300, good protection can be formed, and the signal integrity of the first differential pair DP1 and the second differential pair DP2 when transmitting high-frequency signals can be further improved.

When the cable connector 100 is mated with the board-end connector 200, the first island portion 71 and the second island portion 72 of the board-end connector 200 are accommodated in the mating space 10 of the cable connector 100. The first mating portions 211 of the cable connector 100 are in contact with the first contact portions 811 of the board-end connector 200. The second mating portions 212 of the cable connector 100 are in contact with the second contact portions 821 of the board-end connector 200. When the cable connector 100 in the first embodiment to the third embodiment is mated with the board-end connector 200, the first island portion 71 of the board-end connector 200 is accommodated in the first mating space 101 of the cable connector 100, and the second island portion 72 of the board-end connector 200 is accommodated in the second mating space 102 of the cable connector 100. The isolating piece 40 of the cable connector 100 is inserted into the slot 73 of the board-end connector 200. The isolating piece 40 is inserted into the grooves 8331 of the isolation terminals 83 to be in contact with the engaging portions 833 of the isolation terminals 83.

Compared with the prior art, by arranging the plurality of first cable conductive terminals 21 of the first row L1 and the plurality of second cable conductive terminals 22 of the second row L2 misalignment in the first direction X-X, and by flushing the plurality of first mounting portions 212 of the plurality of first cable conductive terminals 21 with the plurality of second mounting portions 222 of the plurality of second cable conductive terminals 22, the present disclosure improves the arrangement of the first cable conductive terminals 21 and the second cable conductive terminals 22, and facilitates the connection with the first cables 31 and the second cables 32. In addition, by arranging the isolator 49 or the first ground terminal G1/the second ground terminal G2 between the first cable conductive terminals 21 of the first row L1 and the second cable conductive terminals 22 of the second row L2, the cable conductive terminals 2 can be well shielded, crosstalk is reduced, and signal integrity is improved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A cable connector, comprising:

an insulating body extending along a first direction and a second direction, the first direction being perpendicular to the second direction;

a plurality of cable conductive terminals comprising a plurality of first cable conductive terminals disposed in a first row along the second direction and a plurality of second cable conductive terminals disposed in a second row along the second direction, the plurality of first cable conductive terminals in the first row and the plurality of second cable conductive terminals in the second row being disposed at intervals along the first direction for two rows, the plurality of first cable conductive terminals in the first row and the plurality of second cable conductive terminals in the second row being misaligned in the first direction, each of the first cable conductive terminals comprising a first mating portion and a first mounting portion, each of the second cable conductive terminals comprising a second mating portion and a second mounting portion, the plurality of first mounting portions of the plurality of first cable conductive terminals being flush with the plurality of second mounting portions of the plurality of second cable conductive terminals;

a plurality of cables comprising a plurality of first cables connected to the plurality of first mounting portions and a plurality of second cables connected to the plurality of second mounting portions; and a grounding shell comprising an isolator extending along the second direction, the isolator being located between the plurality of first cable conductive terminals of the first row and the plurality of second cable conductive terminals of the second row along the first direction;

wherein the first mounting portions of the plurality of first cable conductive terminals and the second mounting portions of the plurality of second cable conductive terminals are disposed in different rows;

wherein each first mating portion of the first cable conductive terminal is U-shaped, each first mounting portion of the first cable conductive terminal is perpendicular to the first mating portion, and a center surface of the first mating portion of each first cable conductive terminal and a center surface of the first mounting portion of each first cable conductive terminal are aligned or misaligned with each other; and wherein each second mating portion of the second cable conductive terminal is U-shaped, each second mounting portion of the second cable conductive terminal is perpendicular to the second mating portion, and a center surface of the second mating portion of each second cable conductive terminal and a center surface of the second mounting portion of each second cable conductive terminal are aligned or misaligned with each other;

wherein the insulating body comprises a first side wall extending in the second direction and a second side wall extending along the second direction, the first side wall and the second side wall are spaced apart in the first direction, the first side wall and the second side wall are parallel to each other, the insulating body comprises a mating space located between the first side wall and the second side wall, the isolator comprises an isolating piece located in the mating space, the first mating portions of the first cable conductive terminals are fixed to the first side wall and exposed on the first side wall, and the second mating portions of the second cable conductive terminals are fixed to the second side wall and exposed on the second side wall;

wherein the insulating body comprises a first end wall connecting one end of the first side wall and one end of the second side wall, and a second end wall connecting another end of the first side wall and another end of the second side wall, the grounding shell comprises a first ground portion fixed to the first end wall, a second ground portion fixed to the second end wall, a first ground connection piece connecting the first ground portion and the second ground portion, and a second ground connection piece which connects the first ground portion and the second ground portion and is parallel to the first ground connection piece, the isolator comprises the first ground connection piece, the first ground connection piece and the second ground connection piece are located in a first plane, and the isolating piece is located in a second plane perpendicular to the first plane.

2. The cable connector according to claim 1, wherein the isolator comprises an isolating piece which is vertically disposed between the plurality of first cable conductive terminals of the first row and the plurality of second cable conductive terminals of the second row.

3. The cable connector according to claim 1, wherein the plurality of first cables are disposed at intervals along the second direction, and the plurality of second cables are disposed at intervals along the second direction; and wherein one second cable is disposed between any two adjacent first cables, and one first cable is disposed between any two adjacent second cables.

4. The cable connector according to claim 3, wherein the second cable located between two adjacent first cables is located in a middle of the two adjacent first cables, and the first cable located between two adjacent second cables is located in a middle of the two adjacent second cables.

5. The cable connector according to claim 1, wherein a bending direction of the first mounting portion is the same as or opposite to a bending direction of the second mounting portion.

6. The cable connector according to claim 1, further comprising a cable positioning block, the cable positioning block defining a plurality of positioning grooves for positioning the first cables and/or the second cables, the first cables being soldered or welded to the first mounting portions, and the second cables being soldered or welded to the second mounting portions.

7. The cable connector according to claim 1, wherein the first cable conductive terminals, the second cable conductive terminals and the grounding shell are fixed to the insulating body, the second ground connection piece protrudes beyond the insulating body; and wherein each first cable comprises a first isolation woven mesh, each second cable comprises a second isolation woven mesh, the first isolation woven meshes are in contact with the first ground connection piece, and the second isolation woven meshes are in contact with the second ground connection piece.

8. The cable connector according to claim 1, wherein the isolating piece is formed by bending the first ground connection piece; and wherein the first ground connection piece, the second ground connection piece, the isolating piece, the first ground portion and the second ground portion are of a one-piece configuration.

9. The cable connector according to claim 1, further comprising a metal cover mounted on the insulating body, the metal cover is fixed with the grounding shell, the metal cover comprises a hollow slot in which the first isolation woven meshes of the first cables and the second isolation woven meshes of the second cables are at least partially exposed.

10. The cable connector according to claim 1, wherein the plurality of first cable conductive terminals comprise a plurality of first signal terminals and a plurality of second signal terminals, the first signal terminal and the second signal terminal located adjacent to the first signal terminal form a first differential pair;

wherein the plurality of second cable conductive terminals comprise a plurality of third signal terminals and a plurality of fourth signal terminals, the third signal terminal and the fourth signal terminal locate adjacent to third signal terminal form a second differential pair; and wherein the first differential pair and the second differential pair are misaligned in the first direction.

11. A cable connector, comprising:

an insulating body extending along a first direction and a second direction, the first direction being perpendicular to the second direction;

a plurality of cable conductive terminals comprising a plurality of first cable conductive terminals disposed in a first row along the second direction and a plurality of second cable conductive terminals disposed in a second row along the second direction, the plurality of first cable conductive terminals in the first row and the plurality of second cable conductive terminals in the second row being disposed at intervals along the first direction for two rows, the plurality of first cable conductive terminals in the first row and the plurality of second cable conductive terminals in the second row being misaligned in the first direction, each of the first cable conductive terminals comprising a first mating portion and a first mounting portion, each of the second cable conductive terminals comprising a second mating portion and a second mounting portion, the plurality of first mounting portions of the plurality of first cable conductive terminals being flush with the plurality of second mounting portions of the plurality of second cable conductive terminals;

a plurality of cables comprising a plurality of first cables connected to the plurality of first mounting portions and a plurality of second cables connected to the plurality of second mounting portions; and a grounding shell comprising an isolator extending along the second direction, the isolator being located between the plurality of first cable conductive terminals of the first row and the plurality of second cable conductive terminals of the second row along the first direction;

wherein the first mounting portions of the plurality of first cable conductive terminals and the second mounting portions of the plurality of second cable conductive terminals are disposed in different rows;

wherein the plurality of first cable conductive terminals comprise a plurality of first signal terminals and a plurality of second signal terminals, the first signal terminal and the second signal terminal located adjacent to the first signal terminal form a first differential pair;

wherein the plurality of second cable conductive terminals comprise a plurality of third signal terminals and a plurality of fourth signal terminals, the third signal terminal and the fourth signal terminal locate adjacent to third signal terminal form a second differential pair; and wherein the first differential pair and the second differential pair are misaligned in the first direction;

wherein each first mating portion of the first cable conductive terminal is U-shaped, each first cable conductive terminal comprises a first inclined portion connecting the first mating portion and the first mounting portion, so that a center plane of the first mating portion and a center plane of the first mounting portion are misaligned from each other; in the first differential pair, the first inclined portion of the first signal terminal is inclined in a direction away from the second signal terminal, and the first inclined portion of the second signal terminal is inclined in a direction away from the first signal terminal, so that a distance between the first mounting portion of the first signal terminal and the first mounting portion of the second signal terminal along the second direction is greater than a distance between the first mating portion of the first signal terminal and the first mating portion of the second signal terminal along the second direction; and wherein each second mating portion of the second cable conductive terminal is U-shaped, each second cable conductive terminal comprises a second inclined portion connecting the second mating portion and the second mounting portion, a center surface of the second mating portion and a center surface of the second mounting portion are misaligned from each other; in the second differential pair, the second inclined portion of the third signal terminal is inclined in a direction away from the fourth signal terminal, the second inclined portion of the fourth signal terminal is inclined in a direction away from the third signal terminal, and a distance between the second mounting portion of the third signal terminal and the second mounting portion of the fourth signal terminal along the second direction is greater than a distance between the second mating portion of the third signal terminal and the second mating portion of the fourth signal terminal along the second direction.

* * * * *